United States Patent
Phillipps et al.

(10) Patent No.: US 9,646,262 B2
(45) Date of Patent: May 9, 2017

(54) DATA INTELLIGENCE USING MACHINE LEARNING

(71) Applicant: PurePredictive, Inc., Sandy, UT (US)

(72) Inventors: Kelly D. Phillipps, Salt Lake City, UT (US); Richard W. Wellman, Park City, UT (US); Sardar Monzurur Rahman, Sydney (AU); Matthew B. Phillipps, West Jordan, UT (US)

(73) Assignee: PUREPREDICTIVE, INC., Sandy, UT (US)

( * ) Notice: Subject to any disclaimer, the term of this patent is extended or adjusted under 35 U.S.C. 154(b) by 320 days.

(21) Appl. No.: 14/266,119

(22) Filed: Apr. 30, 2014

(65) Prior Publication Data

US 2014/0372346 A1    Dec. 18, 2014

Related U.S. Application Data

(60) Provisional application No. 61/836,135, filed on Jun. 17, 2013.

(51) Int. Cl.
    G06N 99/00    (2010.01)

(52) U.S. Cl.
    CPC ................... G06N 99/005 (2013.01)

(58) Field of Classification Search
    None
    See application file for complete search history.

(56) References Cited

U.S. PATENT DOCUMENTS

| 3,327,291 A | 6/1967 | Lee |
| 5,719,692 A | 2/1998 | Cohen |
| 5,832,467 A | 11/1998 | Wavish |
| 5,832,468 A | 11/1998 | Miller et al. |
| 5,963,910 A | 10/1999 | Ulwick |
| 6,018,619 A | 1/2000 | Allard et al. |
| 6,112,304 A | 8/2000 | Clawson |
| 6,507,726 B1 | 1/2003 | Atkinson et al. |
| 6,523,015 B1 | 2/2003 | Bera et al. |
| 6,894,972 B1 | 5/2005 | Phaal |
| 6,941,367 B2 | 9/2005 | Vosseler et al. |

(Continued)

FOREIGN PATENT DOCUMENTS

| DE | 102010046439 | 3/2012 |
| WO | 2012151198 | 11/2012 |
| WO | 2014110167 | 7/2014 |

OTHER PUBLICATIONS

Application No. PCT/US14/42104, International Search Report and Written Opinion, Dec. 17, 2014.

(Continued)

*Primary Examiner* — Stanley K Hill
*Assistant Examiner* — Benjamin Buss
(74) *Attorney, Agent, or Firm* — Kunzler Law Group

(57) ABSTRACT

Apparatuses, systems, methods, and computer program products are presented for performing data analytics using machine learning. An unsupervised learning module is configured to assemble an unstructured data set into multiple versions of an organized data set. A supervised learning module is configured to generate one or more machine learning ensembles based on each version of multiple versions of an organized data set and to determine which machine learning ensemble exhibits a highest predictive performance.

25 Claims, 9 Drawing Sheets

(56) References Cited

U.S. PATENT DOCUMENTS

| | | |
|---|---|---|
| 7,023,979 B1 | 4/2006 | Wu et al. |
| 7,219,085 B2 | 5/2007 | Buck et al. |
| 7,328,218 B2 | 2/2008 | Steinberg et al. |
| 7,480,640 B1 | 1/2009 | Elad et al. |
| 7,499,897 B2 | 3/2009 | Pinto et al. |
| 7,600,007 B1 | 10/2009 | Lewis |
| 7,689,520 B2 | 3/2010 | Burges et al. |
| 7,814,194 B2 | 10/2010 | Hellerstein et al. |
| 7,890,929 B1 | 2/2011 | Johanson |
| 7,996,415 B1 | 8/2011 | Raffill et al. |
| 8,116,207 B2 | 2/2012 | Schekochikhin et al. |
| 8,160,981 B2 | 4/2012 | Aparicio, IV |
| 8,209,271 B1 | 6/2012 | Lin et al. |
| 8,209,274 B1 | 6/2012 | Lin et al. |
| 8,214,308 B2 | 7/2012 | Chu |
| 8,229,864 B1 | 7/2012 | Lin et al. |
| 8,250,009 B1 | 8/2012 | Breckenridge et al. |
| 8,260,117 B1 | 9/2012 | Xu et al. |
| 8,271,536 B2 | 9/2012 | Amradkar et al. |
| 8,311,967 B1 | 11/2012 | Lin et al. |
| 8,370,279 B1 | 2/2013 | Lin et al. |
| 8,370,280 B1 | 2/2013 | Lin et al. |
| 8,443,438 B1 | 5/2013 | Sharir et al. |
| 8,527,324 B2 | 9/2013 | Richter |
| 8,572,290 B1 | 10/2013 | Mukhopadhyay et al. |
| 8,601,030 B2 | 12/2013 | Bagchi et al. |
| 8,781,995 B2 | 7/2014 | Stergiou et al. |
| 8,880,446 B2 | 11/2014 | Wellman et al. |
| 8,965,814 B1 | 2/2015 | Rangan |
| 9,081,805 B1 | 7/2015 | Stamen et al. |
| 9,082,083 B2 | 7/2015 | Virkar et al. |
| 9,218,574 B2 | 12/2015 | Phillipps et al. |
| 2002/0107712 A1* | 8/2002 | Lam ............... G06Q 10/063 705/7.11 |
| 2002/0159641 A1 | 10/2002 | Whitney et al. |
| 2002/0184408 A1 | 12/2002 | Hannigan et al. |
| 2003/0069869 A1 | 4/2003 | Gronau et al. |
| 2003/0088425 A1 | 5/2003 | Lam et al. |
| 2003/0097302 A1 | 5/2003 | Overhultz et al. |
| 2004/0059966 A1 | 3/2004 | Chan et al. |
| 2004/0078175 A1 | 4/2004 | Shaw et al. |
| 2005/0076245 A1 | 4/2005 | Graham et al. |
| 2005/0090911 A1 | 4/2005 | Ingargiola et al. |
| 2005/0132052 A1 | 6/2005 | Uttamchandani et al. |
| 2005/0228789 A1 | 10/2005 | Fawcett et al. |
| 2005/0267913 A1 | 12/2005 | Stienhans et al. |
| 2005/0278362 A1 | 12/2005 | Maren et al. |
| 2006/0247973 A1 | 11/2006 | Mueller et al. |
| 2007/0043690 A1 | 2/2007 | Inakoshi et al. |
| 2007/0111179 A1 | 5/2007 | Hochwarth et al. |
| 2007/0112824 A1 | 5/2007 | Lock et al. |
| 2008/0043617 A1 | 2/2008 | Schekochikhin et al. |
| 2008/0162487 A1 | 7/2008 | Richter |
| 2008/0168011 A1 | 7/2008 | Steinberg |
| 2008/0313110 A1 | 12/2008 | Kreamer et al. |
| 2009/0035733 A1 | 2/2009 | Meitar et al. |
| 2009/0089078 A1 | 4/2009 | Bursey |
| 2009/0177646 A1 | 7/2009 | Pham et al. |
| 2009/0186329 A1 | 7/2009 | Connor |
| 2009/0222742 A1 | 9/2009 | Pelton et al. |
| 2009/0254379 A1 | 10/2009 | Adams et al. |
| 2009/0327172 A1 | 12/2009 | Liu et al. |
| 2010/0009330 A1 | 1/2010 | Yaskin |
| 2010/0010878 A1 | 1/2010 | Pinto et al. |
| 2010/0010948 A1 | 1/2010 | Ito et al. |
| 2010/0023798 A1 | 1/2010 | Meijer et al. |
| 2010/0100519 A1 | 4/2010 | Aaron et al. |
| 2010/0114663 A1 | 5/2010 | Casas et al. |
| 2010/0131314 A1 | 5/2010 | Lo Yuk Ting et al. |
| 2010/0138026 A1 | 6/2010 | Kaushal et al. |
| 2010/0145902 A1 | 6/2010 | Boyan et al. |
| 2010/0201512 A1 | 8/2010 | Stirling et al. |
| 2010/0205125 A1 | 8/2010 | Whitehead et al. |
| 2010/0223212 A1 | 9/2010 | Manolescu et al. |
| 2010/0306141 A1 | 12/2010 | Chidlovskii |
| 2011/0111384 A1 | 5/2011 | Dietrich et al. |
| 2011/0119300 A1 | 5/2011 | Marcade |
| 2011/0137672 A1 | 6/2011 | Adams et al. |
| 2011/0161055 A1 | 6/2011 | Cases et al. |
| 2011/0184575 A1 | 7/2011 | Kawamoto et al. |
| 2011/0265069 A1 | 10/2011 | Fee et al. |
| 2011/0288867 A1* | 11/2011 | Chengalvarayan ... G10L 15/063 704/251 |
| 2011/0302153 A1 | 12/2011 | Meretakis et al. |
| 2011/0307889 A1 | 12/2011 | Moriki et al. |
| 2012/0004893 A1 | 1/2012 | Vaidyanathan et al. |
| 2012/0030160 A1 | 2/2012 | Ratnam et al. |
| 2012/0078825 A1 | 3/2012 | Kulkarni et al. |
| 2012/0079134 A1 | 3/2012 | Outhred et al. |
| 2012/0143995 A1 | 6/2012 | Calvin et al. |
| 2012/0158620 A1 | 6/2012 | Paquet et al. |
| 2012/0158624 A1 | 6/2012 | Lingenfelder et al. |
| 2012/0191630 A1 | 7/2012 | Breckenridge et al. |
| 2012/0191631 A1 | 7/2012 | Breckenridge et al. |
| 2012/0221503 A1 | 8/2012 | Williamson |
| 2012/0284212 A1 | 11/2012 | Lin et al. |
| 2012/0284213 A1 | 11/2012 | Lin et al. |
| 2012/0284600 A1 | 11/2012 | Lin et al. |
| 2012/0330971 A1* | 12/2012 | Thomas ............... G06N 99/005 707/748 |
| 2013/0004930 A1 | 1/2013 | Sorenson et al. |
| 2013/0066886 A1 | 3/2013 | Bagchi et al. |
| 2013/0074091 A1 | 3/2013 | Xavier et al. |
| 2013/0191257 A1 | 7/2013 | Koodli et al. |
| 2013/0197967 A1 | 8/2013 | Pinto et al. |
| 2013/0218042 A1 | 8/2013 | Mardirossian |
| 2014/0136452 A1 | 5/2014 | Wellman et al. |
| 2014/0180738 A1 | 6/2014 | Phillipps et al. |
| 2014/0195466 A1 | 7/2014 | Phillipps et al. |
| 2014/0205990 A1 | 7/2014 | Wellman et al. |
| 2014/0236875 A1 | 8/2014 | Phillipps et al. |
| 2014/0280492 A1 | 9/2014 | Yang et al. |
| 2014/0358825 A1 | 12/2014 | Phillipps et al. |
| 2014/0358828 A1 | 12/2014 | Phillipps et al. |
| 2014/0372346 A1 | 12/2014 | Phillipps et al. |
| 2014/0372513 A1 | 12/2014 | Jones |
| 2015/0058266 A1 | 2/2015 | Wellman et al. |
| 2015/0213372 A1* | 7/2015 | Shah ............... H04L 51/32 706/12 |
| 2015/0381552 A1* | 12/2015 | Vijay ............... H04L 51/32 709/206 |

OTHER PUBLICATIONS

U.S. Appl. No. 13/749,618, Office Action, Dec. 22, 2014.
Cabena, et al., "Intelligent Miner for Data Applications Guide", IBM, 1998, pp. 89-103.
U.S. Appl. No. 13/725,995, Office Action, Apr. 2, 2015.
Ilijasic, Lovro, "Computational Grids as Complex Networks", Torino, 2010.
"HP Process Resource Manager User's Guide", Hewlett-Packard Development Company, Version C.03.05, Jan. 2009.
Steinberg, Dan, "CART 6.0", Salford Systems, 2006, pp. 440, www.salford-systems, com.
"SPM Features", Salford Systems—Data Mining and Predictive Analytics Software, downloaded Apr. 30, 2015, pp. 5, https://www.walford-systems, com/products/spm-features.
U.S. Appl. No. 13/904,963, Office Action, May 15, 2015.
Cabena P., "Intelligent Miner for Data Applications Guide", IBM Corporation, International Technical Support Organization, 1999.
Kolter, J., et al, "Dynamic Weighted Majority: An Ensemble Method for Drifting Concepts", Journal of Machine Learning Research, 8, 2007, pp. 2755-2790.
Purpura, S., et al., "Statistically Adaptive Learning for a General Class of Cost Functions (SA L-BFGS)", 2012.
Frank E., et al., "Weka-A Machine Learning Workbench for Data Mining", Data Mining and Knowledge Discovery Handbook, 2nd ed., 2010.
Hall, M., et al., "The WEKA Data Mining Software: An Update", SIGKDD Explorations, vol. 11, Issue 1, 2009.

(56) References Cited

OTHER PUBLICATIONS

Application No. PCT/US2013/070358, International Preliminary Report on Patentability, May 28, 2015.
U.S. Appl. No. 13/749,618, Office Action, Jul. 8, 2014.
Application No. PCT/US2014/013028, International Search Report and Written Opinion, May 15, 2014.
Application No. PCT/US14/39859, International Search Report and Written Opinion, Oct. 16, 2014.
Application No. PCT/US14/39861, International Search Report and Written Opinion, Oct. 16, 2014.
Application No. PCT/US14/42754, International Search Report and Written Opinion, Oct. 15, 2014.
U.S. Appl. No. 14/014,322, Office Action, Aug. 27, 2015.
U.S. Appl. No. 13/725,995, Office Action, Sep. 24, 2015.
Ilijasic, Lovro, "Computational Grids as Complex Networks", Torino, pp. 130, 2010.
"HP Process Resource Manager User's Guide Version C.03.05", Hewlett-Packard Development Company, pp. 111, Jan. 2009.
U.S. Appl. No. 14/531,893, Office Action, Sep. 25, 2015.
Kolter, J. Zico, "Dynamic Weighted Majority: An Ensemble Method for Drifting Concepts", Journal of Machine Learning Research, pp. 36, Dec. 2007.
"Oracle Database 11g: Data Mining Techniques", Oracle, Feb. 2012, pp. 122, Edition 1.0.
"Oracle Data Mining 11g Release 2", Oracle White Paper, Feb. 2012, pp. 29.
U.S. Appl. No. 14/150,327, Office Action, Dec. 18, 2015.
Application No. PCT/US2014/039861, International Preliminary Report on Patentability, Dec. 10, 2015.
Application No. PCT/US2014/039859, International Preliminary Report on Patentability, Dec. 10, 2015.
Application No. PCT/US2014/042104, International Preliminary Report on Patentability, Dec. 23, 2015.
Application No. PCT/US2014/042754, International Preliminary Report on Patentability, Dec. 30, 2015.
U.S. Appl. No. 14/162,571, Office Action, Jan. 4, 2016.
McTigue, Jake, "Predictive Analytics for IT", Information Week, Mar. 2012, pp. 17.
Purpura, Stephen, "Statistically Adaptive Learning for a General Class of Cost Functions (SA L-BFGS)", Sep. 5, 2012, pp. 7, arXiv:1209.0029v3 [cs.LG].
U.S. Appl. No. 13/870,861, Office Action, Sep. 12, 2013.
Kolter, J. Zico, et al., "Dynamic Weighted Majority: An Ensemble Method for Drifting Concepts", Journal of Machine Learning Research 8, 2007, pp. 2755-2790.
Application No. PCT/US2013/077236, International Search Report and Written Opinion, Feb. 24, 2014.
Application No. PCT/US2013/070358, International Search Report and Written Opinion, Feb. 28, 2014.
U.S. Appl. No. 13/870,861, Office Action, Apr. 8, 2014.
PCT/US2013/077236, International Preliminary Report on Patentability, Jul. 2, 2015.
PCT/US2014/013028, International Preliminary Report on Patentability, Aug. 6, 2015.
PCT/US2014/010729, International Preliminary Report on Patentability, Jul. 23, 2015.
U.S. Appl. No. 13/904,963, Notice of Allowance, Oct. 20, 2015.
U.S. Appl. No. 13/870,861, Notice of Allowance, Jun. 20, 2014.
Bennett, Casey C., "EHRs Connect Research and Practice: Where Predictive Modeling, Artificial Intelligence, and Clinical Decision Support Intersect", Health Policy and Technology (2012), pp. 24.
Application No. PCT/US14/10729, International Search Report and Written Opinion, Aug. 28, 2014.
U.S. Appl. No. 14/162,571 Final Rejection mailed Jun. 29, 2016.
U.S. Appl. No. 14/150,327 (3128.2A) Final Office Action mailed Nov. 25, 2016.
U.S. Appl. No. 14/162,571 (3128.2.7) Office Action dated Feb. 23, 2017.

* cited by examiner

DATA INTELLIGENCE USING MACHINE LEARNING

CROSS-REFERENCES TO RELATED APPLICATIONS

This application claims priority to U.S. Provisional Patent Application No. 61/836,135 entitled "Data Intelligence Using Machine Learning" and filed on Jun. 17, 2013 for Kelly D. Phillipps et al., which is incorporated herein by reference.

TECHNICAL FIELD

The present disclosure, in various embodiments, relates to data intelligence and more particularly relates to data intelligence using machine learning.

BACKGROUND

Business intelligence (BI) may include processing and analysis of data for business purposes. Businesses typically accumulate large amounts of data, with different data created for different purposes and by different sources.

Because potentially related data across a business entity may have different formatting and in many cases is not identified or indexed as being related, business opportunities may be missed. Further, manual location and organization of related data can be time consuming and inaccurate. Even if portions of data location and/or organization may be automated, a human typically reviews the data, making imprecise manual approximations and assumptions.

SUMMARY

An apparatus is presented for performing data analytics using machine learning. In one embodiment, an extract module is configured to extract data from one or more structured data sources. A load module, in a further embodiment, is configured to load data into an unstructured data set. An unsupervised learning module, in certain embodiments, is configured to assemble an unstructured data set into an organized data set using a plurality of unsupervised learning techniques.

Another apparatus for performing data analytics using machine learning is presented. In one embodiment, an unsupervised learning module is configured to assemble an unstructured data set into multiple versions of an organized data set. A supervised learning module, in certain embodiments, is configured to generate one or more machine learning ensembles based on each version of multiple versions of an organized data set and to determine which machine learning ensemble exhibits a highest predictive performance.

A method is presented for performing data analytics using machine learning. A method, in one embodiment, includes extracting data from one or more data sources. In a further embodiment, a method includes loading data into an unstructured data set having an unstructured format. A method, in certain embodiments, includes assembling an unstructured data set into an organized data set having a structured format. In another embodiment, a method includes generating one or more learned functions based on an organized data set.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1:
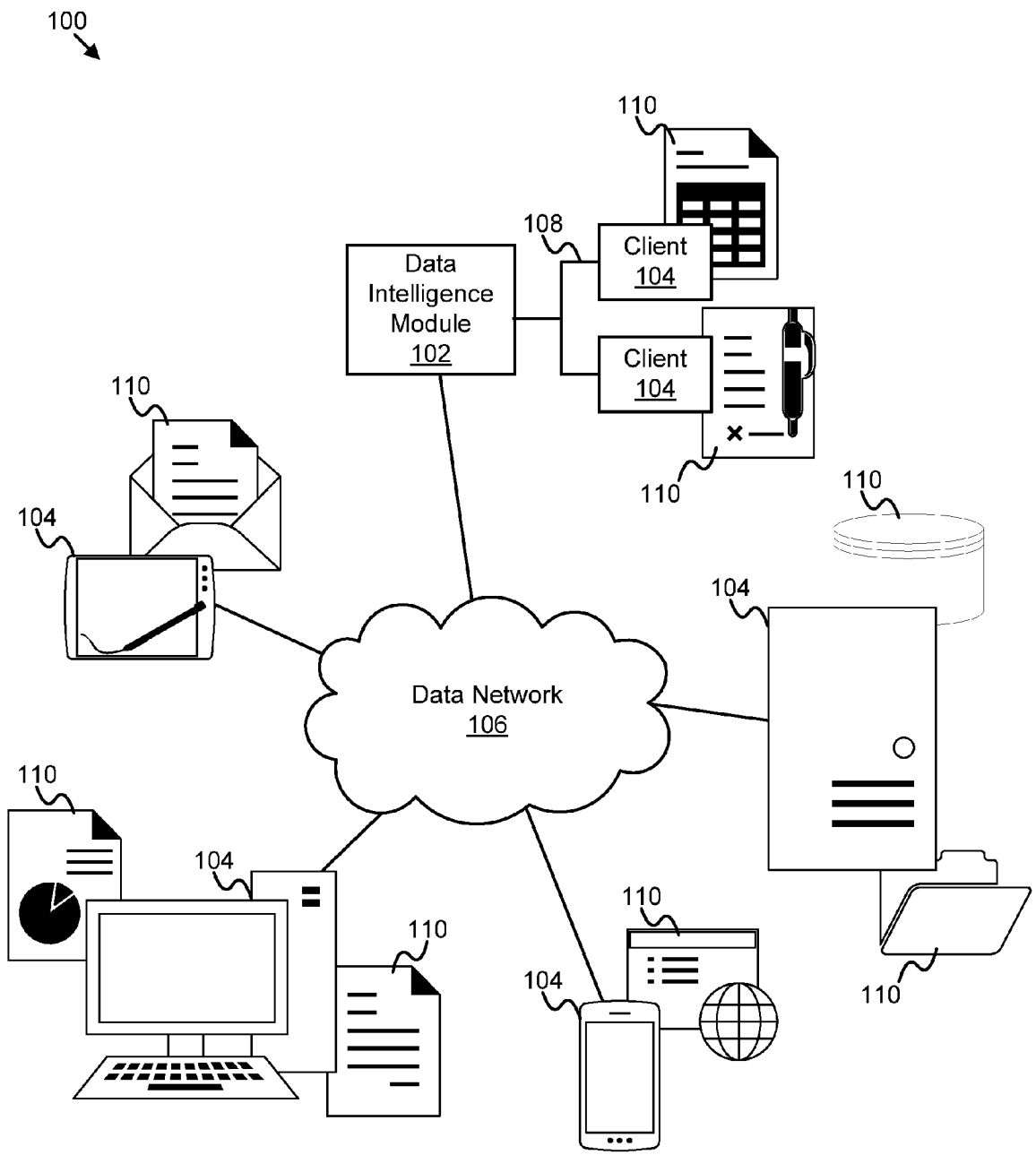
FIG. 1 is a schematic block diagram illustrating one embodiment of a system for data intelligence.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

FIG. 1 depicts one embodiment of a system 100 for data intelligence. The system 100, in the depicted embodiment, includes a data intelligence module 102. The data intelligence module 102 may be in communication with several data sources 104, other data intelligence modules 102, or the like over a data network 106, over a local channel 108 such as a system bus, an application programming interface (API), or the like. A data source 104 may comprise an enterprise data source, a data storage device, a software application, a database, an input device, a document scanner, a user, a hardware computing device with a processor and memory, or another entity in communication with a data intelligence module 102.

In general, the data intelligence module 102 is configured to extract data from one or more structured data sources 104. The extracted data may then be loaded into an unstructured data set. In certain embodiments, the data intelligence module 102 then uses one or more unsupervised learning techniques to identify relationship between data 110 in the unstructured data set and/or assemble the data into an organized data set. The organized data set may include all of that data 110 from the unstructured data set, or a subset of the data 110, such as one or more assembled instances. The resulting organized data set and/or identified relationships can then be used to create learned functions that may provide predictive results based on the data from the structured data sources.

Thus, in certain embodiments, the data intelligence module 102, instead of or in addition to an "Extract", "Transform," and "Load" (ETL) process, the data intelligence module 102 may use an "Extract," "Load," and "Learn" (ELL) process to assemble data and/or to provide business intelligence using machine learning. Thus, in certain embodiments, this process effectively eliminates the most time consuming step of "Transformation" within the traditional ETL process and then relying on unsupervised and/or supervised learning processes to assemble a meaningful instead of through the traditional use of manual, human intervention with its accompanying errors and bias.

The data intelligence module 102 may be configured to identify one or more data sources 104 (e.g., an automated scan, based on user input, or the like) and to extract data 110 from the identified data sources 104 (e.g., "extract" the data 110). Instead of or in addition to transforming the data 110 into a rigid, structured format, in which certain metadata or other information associated with the data 110 and/or the data sources 104 may be lost, incorrect transformations may be made, or the like, the data intelligence module 102 may load the data 110 in an unstructured format and automatically determine relationships between the data 110 (e.g., "load" the data 110). The data intelligence module 102 may use machine learning, as described below, to identify relationships between data in an unstructured format, assemble the data into a structured format, evaluate the correctness of the identified relationships and assembled data, and/or provide machine learning functions to a user based on the extracted and loaded data 110 (e.g., in either a raw or pre-processed form), and/or evaluate the predictive performance of the machine learning functions (e.g., "learn" from the data 110).

In certain embodiments, the data intelligence module 102 assembles data 110 into an organized format using one or more unsupervised learning techniques. These unsupervised learning techniques can identify relationship between data elements in an unstructured format and use those relationships to provide join instructions and/or to join related data 110. Unsupervised learning is described in greater detail below with reference to FIGS. 2A through 2B.

In certain embodiments, the data intelligence module 102 can use the organized data derived from the unsupervised learning techniques in supervised learning methods to generate one or more machine learning ensembles. These machine learning ensembles may be used to respond to analysis requests (e.g., processing collected and coordinated data using machine learning) and to provide machine learning results, such as a classification, a confidence metric, an inferred function, a regression function, an answer, a prediction, a recognized pattern, a rule, a recommendation, or other results. Supervised machine learning, as used herein, comprises one or more modules, computer executable program code, logic hardware, and/or other entities configured to learn from or train on input data, and to apply the learning or training to provide results or analysis for subsequent data. Supervised learning and generating machine learning ensembles or other machine learning program code is described in greater detail below with reference to FIG. 2A through FIG. 8.

In one embodiment, the data intelligence module 102 may provide, access, or otherwise use predictive analytics. Predictive analytics is the study of past performance, or patterns, found in historical and transactional data to identify behavior and trends in unknown future events. This may be accomplished using a variety of techniques including statistics, modeling, machine learning, data mining, and others.

One term for large, complex, historical data sets is Big Data. Examples of Big Data include web logs, social networks, blogs, system log files, call logs, customer data, user feedback, RFID and sensor data, social networks, Internet search indexing, call detail records, military surveillance, and complex data in astronomic, biogeochemical, genomics, and atmospheric sciences. These data sets may often be so large and complex that they are awkward and difficult to work with using traditional tools.

In certain embodiments, prediction may be applied through at least two general techniques: Regression and Classification. Regression models attempt to fit a mathematical equation to approximate the relationship between the variables being analyzed. These models may include "Discrete Choice" models such as Logistic Regression, Multinomial Logistic Regression, Probit Regression, or the like. When factoring in time, Time Series models may be used, such as Auto Regression—AR, Moving Average—

MA, ARMA, AR Conditional Heteroskedasticity—ARCH, Generalized ARCH—GARCH and Vector AR—VAR. Other models include Survival or Duration analysis, Classification and Regression Trees (CART), Multivariate Adaptive Regression Splines (MARS), and the like.

Classification is a form of artificial intelligence that uses computational power to execute complex algorithms in an effort to emulate human cognition. One underlying problem, however, remains: determining the set of all possible behaviors given all possible inputs is much too large to be included in a set of observed examples. Classification methods may include Neural Networks, Radial Basis Functions, Support Vector Machines, Nave Bayes, k-Nearest Neighbors, Geospatial Predictive modeling, and the like.

Each of these forms of modeling make assumptions about the data set and model the given data, however, some models are more accurate than others and none of the models are ideal. Historically, using predictive analytics or other machine learning tools was a cumbersome and difficult process, often involving the engagement of a Data Scientist or other expert. Any easier-to-use tools or interfaces for general business users, however, typically fall short in that they still require "heavy lifting" by IT personnel in order to present and massage data and results. A Data Scientist typically must determine the optimal class of learning machines that would be the most applicable for a given data set, and rigorously test the selected hypothesis by first fine-tuning the learning machine parameters and second by evaluating results fed by trained data.

The data intelligence module 102, in certain embodiments, generates machine learning ensembles or other machine learning program code for the clients 104, with little or no input from a Data Scientist or other expert, by generating a large number of learned functions from multiple different classes, evaluating, combining, and/or extending the learned functions, synthesizing selected learned functions, and organizing the synthesized learned functions into a machine learning ensemble. The data intelligence module 102, in one embodiment, services analysis requests for the clients 104 using the generated machine learning ensembles or other machine learning program code.

By generating a large number of learned functions, without regard to the effectiveness of the generated learned functions, without prior knowledge of the generated learned functions suitability, or the like, and evaluating the generated learned functions, in certain embodiments, the data intelligence module 102 may provide machine learning ensembles or other machine learning program code that are customized and finely tuned for a particular machine learning application, data from a specific client 104, or the like, without excessive intervention or fine-tuning. The data intelligence module 102, in a further embodiment, may generate and evaluate a large number of learned functions using parallel computing on multiple processors, such as a massively parallel processing (MPP) system or the like. Machine learning ensembles or other machine learning program code are described in greater detail below with regard to FIG. 2A, FIG. 2B, FIG. 3, FIG. 4, and FIG. 5.

The data intelligence module 102 may service machine learning requests to clients 104 locally, executing on the same host computing device as the data intelligence module 102, by providing an API to clients 104, receiving function calls from clients 104, providing a hardware command interface to clients 104, or otherwise providing a local channel 108 to clients 104. In a further embodiment, the data intelligence module 102 may service machine learning requests to clients 104 over a data network 106, such as a local area network (LAN), a wide area network (WAN) such as the Internet as a cloud service, a wireless network, a wired network, or another data network 106.

Figure 2A:
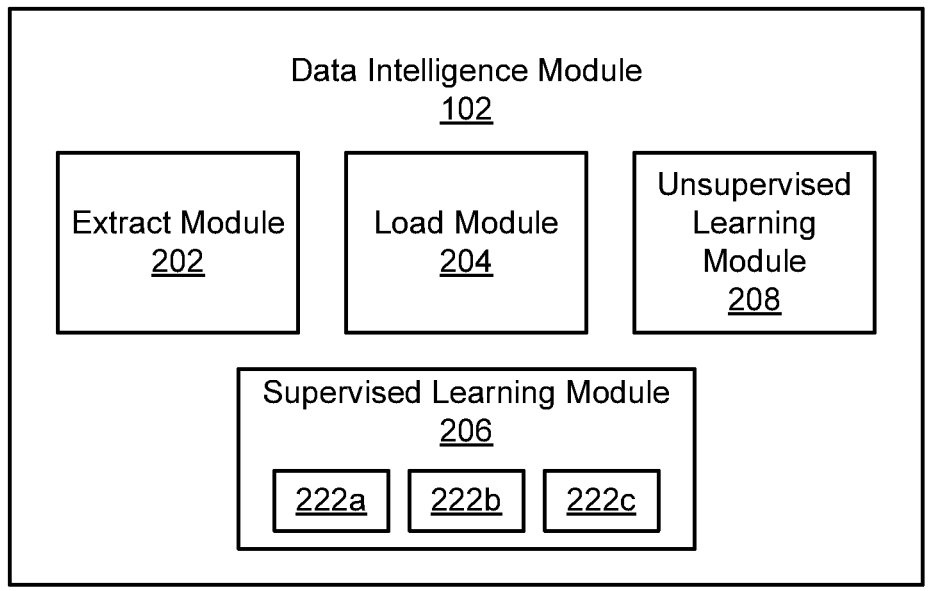
FIG. 2A is a schematic block diagram illustrating one embodiment of a data intelligence module.

FIG. 2A depicts an embodiment of the data intelligence module 102. In the depicted embodiment, the data intelligence module 102 includes an extract module 202, a load module 204, an unsupervised learning module 208, and a supervised learning module 206. The data intelligence module 102, in one embodiment, uses the extract module 202, the load module 204, the unsupervised learning module 208, and the supervised learning module 206 to perform an extract, load, and learn (ELL), effectively eliminating the need for manual data transformations and providing an additional learning function to derive new meaning and interpretations from extracted data sets.

In one embodiment, the extract module 202 is configured to gather, collect, or otherwise extract data from one or more data sources 104. Additionally, in certain embodiments, prior to extracting data, the extract module 202 may identify the data sources 104 from which it will or may extract data 110. For example, the extract module 202 may automatically scan data sources 104 to which the extract module 202 has access to identify available data sources. In another example, the extract module 202 receives manual user input that identifies one or more data sources 104 and/or specific data within the one or more data sources 104 to be extracted. In yet another example, the extract module 202 identifies data sources 104 based on one or more declared business objectives of the data intelligence module 102. The objectives may be received manually or automatically deduced. In certain embodiments, the extract module 202 is configured to extract data from the running data source 104 that is not solely dedicated to providing data to the data intelligence module 102.

The extract module 202 may extract data from its native, structured sources 104. In certain embodiments, the data sources 104 from which data is extracted by the extract module 202 are structured data sources or data sources that primarily include structured data. Structured data includes data with a predictable structure or data model (a description of the objects represented by the data and/or a description of the object's properties and relationships) or is organized in a predefined manner. Conversely, unstructured data is data that does not have a predefined data model (a description of the objects represented by the data and/or a description of the object's properties and relationships) or is not organized in a predefined manner. Semi-structured data is a form of structured data that does not conform with the formal structure of data models associated with relational databases or other forms of data tables, but nonetheless contains tags or other markers to separate semantic elements and enforce hierarchies of records and fields within the data.

The extract module 202 can extract various types of data that may be used by the unsupervised learning module 208 and the supervised learning module 206. Non-limiting examples of data 110 that the can extract include, spreadsheets and spreadsheet data, documents, emails, text files, database files, log files, transaction records, purchase orders, metadata, executable code, schema information or definitions, structured query language (SQL) statements, predictive byte code, executable code (with its data manipulation and reporting instructions, such as SQL code), data definition instructions, and other types of data 110. The extract module 202, in a further embodiment, may extract or mine specific feature sets from a data set 110 based on the data set 110's relationships and/or relevance to a declared business goal, as determined by the supervised learning module 206 or the like.

The load module 204 may load the data 110 into an unstructured data set, including a Big Data data set. In certain embodiments, the load module 204 may load the data 110 into a relational database management system such as a binary large object (BLOB). The load module 204 may also load the data 110 into an unstructured or semi-structured solution, such as or as an Apache Hadoop or other like solution. The load module 204 can maintain at least a portion or all of the data's original information (e.g., metadata, context, formatting). As such the load module 204 can load data in an unstructured or semi-structured format.

By loading data into a large data set of unstructured and/or semi-structured data, the unsupervised learning module 208 and/or the supervised learning module 206 may be able to discover relationships through machine learning as opposed to using manual, human labor. In certain embodiments, the unsupervised learning module may create substantially comprehensive instances to form an organized data set using joins, cross products, or the like, as described herein.

In certain embodiments, the load module 204 may cooperate with the unsupervised learning module 208 to assemble or restructure the unstructured data set. In some embodiments, the unsupervised learning module 208 is a subcomponent of the load module 204. In other embodiments, these are separate modules, as shown in FIG. 2A. For simplicity of discussion, the following description will refer to these modules as separate module with separate functions, though as mentioned in some embodiments these modules ma share some or all of their functions.

The unsupervised learning module 208 may assemble the unstructured data set, which was loaded by the load module 204, into an organized data set. As mentioned, the organized data set may include all or just some of the data from the unstructured data set. The organized data set may include one or more instances formed by formed by an organizing data elements of the data set using joins, cross products, and other unsupervised learning techniques, as described herein. The organized data set can be a combined, data warehouse, which comprises multiple data marts. The load module 204 and/or the unsupervised learning module 208 can suggest, define, or create data marts, identifying the constituent parts or the like, by combining and analyzing features of disparate tables or other data sources 104. The process of assembling an organized data set may include defining relationships (e.g., connections, distances, and/or confidences) between data elements of the unstructured data set using a plurality of unsupervised learning techniques. In general, unsupervised learning techniques attempt to discover structure in unstructured or semi-structured data. Examples of unsupervised learning techniques described with reference to FIG. 2B.

Optionally, the unsupervised learning module 208 may provide output results (e.g., probabilities, connections, distances, instances, or the like) that inform or populate a probabilistic graph database, a metadata layer for a probabilistic graph database, or the like. The unsupervised learning module 208 may populate other data structures, displays, visualizations, or the like with output results. In some embodiments, the data intelligence module 102 includes or communicates with a visualization module (not shown) for displaying results from the unsupervised learning module 208 and/or the supervised learning module 206.

In certain embodiments, the unsupervised learning module 208 can identify or receive target concepts or business objectives that identifies what type of predictions are needed or request by a data intelligence module 102 and/or end user. This may involve requesting manual input from a user or identifying a known objective/concept. Non-limiting examples of business objective may include identify what types of products customers in a given zip code purchase, identifying which department of a company has the highest efficiency or overhead, or identifying what type of product a target demographic is likely to purchase next year. The unsupervised learning module 208 can configure unsupervised learning techniques to identify relationships among data element of the data set that relate to the target concept or business objective. For example, the unsupervised learning module 208 can configure a clustering algorithm (an unsupervised learning technique) to cluster around concepts related to the target concept or business objective.

The unsupervised learning module 208 may use supervised learning, such as one or more machine learning ensembles 222a-c or other predictive programs, to provide feedback to the unsupervised learning module 208. Since the data used by the unsupervised learning module 208 is generally unlabeled, it may be difficult to evaluate the accuracy of the structuring of the resulting organized data set with the unsupervised learning module 208 alone. Accordingly, in certain embodiments, the supervised learning module 206 can evaluate the accuracy of the structure of the organized data set. The supervised learning module 206 can use machine learning to generate one or more learned functions and/or machine learning ensembles 222a-c based on the organized data set. The supervised learning module 206 can then evaluate the predictive performance of the one or more learned functions and/or machine learning ensembles 222a-c to provide an evaluation of the structuring of the organized data set. A detailed description of the general operation of the supervised learning module 206 is provided below with reference to FIGS. 3 to 8.

Given the large amount of processing power and time that may be required by the unsupervised learning module 208 to develop the organized data set, in certain embodiments, the unsupervised learning module 208 is configured to assemble a subset or sample of the unstructured data set into an organized, trial data set. This organized, trial data set may be developed faster since it can required less processing power and time to process with the unsupervised learning techniques. Additionally or alternatively, in some embodiments, the unsupervised learning module 208 may be configured to perform abbreviated or partial analysis when developing the organized, trial data set, in order to expedite the development process.

The organized, trial data set may be input into the supervised learning module 206 for evaluation, as previously described. Based on the results of the evaluation, the supervised learning module 206 and/or another module of the data intelligence module 102 may assess the accuracy of the organized, trial data set.

In certain embodiments, the unsupervised learning module 208 is configured to assemble the unstructured data set into multiple versions of an organized data set. For instance, the unsupervised learning module 208 can assemble tens, hundreds, or thousands of versions of organized data sets. Each version can be assembled using a unique combination of unsupervised learning techniques and thus each version may identify different relationships between data elements of the data set. Additionally or alternatively, the unsupervised learning module 208 can assemble two or more versions of organized data sets using the same combination of unsupervised learning techniques, but by varying the parameters, key concepts, or business objectives used by the unsupervised learning techniques. As such each version of the organized data sets may be substantially different. Furthermore, the unsupervised learning module 208 can assemble each of these versions of the organized data set based only on a subset or sample of the unstructured data set, as previously described, such that each version is an organized, trial data set. By assembling a large number of data sets in this way without regard to accuracy, the probability that an accurate data set is developed increases.

To evaluate these versions of the organized data sets, the supervised learning module 206 can be configured to generate one or more machine learning ensemble based on each of the multiple versions of the structured data set. Each of these machine learning ensembles 222a-c can be evaluate by the supervised learning module 206, which can then determine which version exhibits the highest predictive performance. Predictive performance may indicate which machine learning ensemble can predict unknown values with the highest degree of accuracy. These predictions may be evaluated using test data, as discussed herein. The data intelligence module 102 may use the machine learning ensemble with the highest predictive performance to provide predictive functionality to the user. Unused data sets may be discarded.

The results of these evaluations may also be utilized by the supervised learning module 206 and/or another module of the data intelligence module 102 to identify which unique combination of unsupervised learning techniques was used to assemble the version of the organized data set that exhibited the highest predictive performance. In instances where the organized data set that exhibited the highest predictive performance is a trial data set, as previously described, the unsupervised learning module 208 can assemble a more complete data set using the same unique combination unsupervised learning techniques used to develop the trial data set, but by processing the complete set of data from the unstructured data set. Similarly, if the unsupervised learning module 208 formed the trial data set using an abbreviated or partial analysis, a complete analysis can be performed. The supervised learning module 206 can then generate one or more learned functions or machine learning ensembles based on the complete data set. These learned functions or machine learning ensembles can be used by the data intelligence module 102 to provide predictive results to the end user(s).

As mentioned, in certain embodiments, the unsupervised learning module 208 is configured to create one or more data sets that can be input into the supervised learning module 206. For example, the organized data set assembled by the unsupervised learning module 208 can be input into the supervised learning module 206. Additionally, in certain embodiments, the unsupervised learning module 208 is configured to create training data from the structured data set. For example, the unsupervised learning module 208 can assemble the data elements in one or more instances that can be used to train the supervised learning module 206. The supervised learning module 206 can be configured to use the training data to generate machine learning ensembles.

In one embodiment, the supervised learning module 206 is configured to populate a data visualization tool, a report, or the like based on probabilistic relationships derived from machine learning. These tools may be displayed via a visualization module (not shown), as previously mentioned. The supervised learning module 206, in a further embodiment, may update the original data sources 104, such as one or more databases or the like, with the predicted machine learning results. Alternatively, in some embodiments, the data intelligence module 102 includes an update module (not shown) configured to update the one or more data sources with predicted results generated by the one or more machine learning ensembles.

The supervised learning module 206 may provide machine learning results for strategic decision making and analysis. If the data 110 is material and the unsupervised learning module 208 has made optimal connections, the loaded unstructured data set may not need to be precise. The supervised learning module 206, in certain embodiments, may not provide precise, operational reporting, but accurate analytics reporting. The supervised learning module 206, in one embodiment, may dynamically generate one or more machine learning ensembles 222a-c or other predictive programs, using unstructured or semi-structured data 110 from the load module 204 as training data, test data, and/or workload data, as described below.

In this manner, the extract module 202 may first extract data 110 into general buckets (e.g., clusters or focal points), the unsupervised learning module 204 may process and mine the extracted data 110 to form relationships without knowing specific uses for the data 110, just mapping confidence intervals or distances, then feed the data and/or the confidence intervals or distances to the supervised learning module 206 (e.g., the definition of a problem statement, goal, action label, or the like). The supervised learning module 206, in certain embodiments, may provide a report, a visualization, or the like for produced machine learning results or may otherwise catalog the machine learning results for business intelligence or the like.

In one embodiment, the load module 204 or the unsupervised learning module 208 may add time variance to the data set, enabling the supervised learning module 206 to refresh or regenerate the machine learning ensembles 222a-c or other predictive programs at various time intervals. The supervised learning module 206 may guide an end-user in terms of governance, prioritization, or the like to find an optimal business value, providing value-based prioritization or the like.

As described below with regard to FIGS. 3 and 4, the supervised learning module 206 may be configured to generate machine learning using a compiler/virtual machine paradigm. The supervised learning module 206 may generate a machine learning ensemble with executable program code (e.g., program script instructions, assembly code, byte code, object code, or the like) for multiple learned functions, a metadata rule set, an orchestration module, or the like. The supervised learning module 206 may provide a predictive virtual machine or interpreter configured to execute the program code of a machine learning ensemble with workload data to provide one or more machine learning results.

Figure 2B:
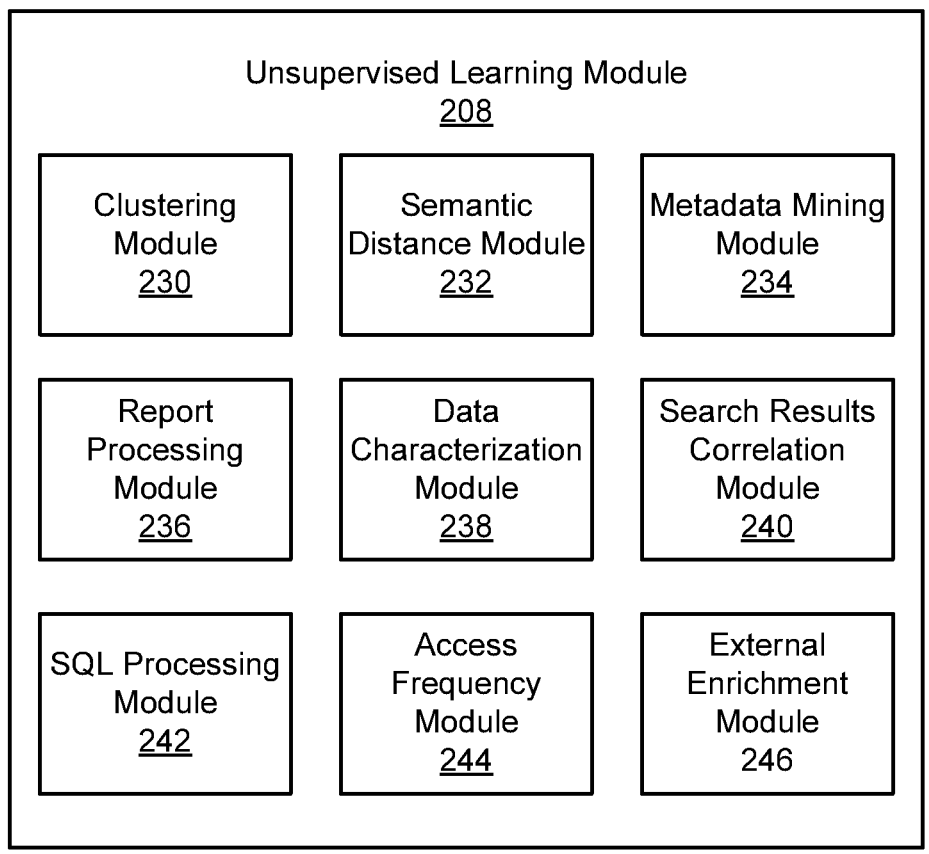
FIG. 2B is a schematic block diagram illustrating one embodiment of an unsupervised learning module.

Reference will now be made to FIG. 2B, which illustrates one embodiment of an unsupervised learning module 208. As shown, embodiments of the unsupervised learning module 208 can include multiple sub-modules, including a clustering module 230, a semantic distance module 232, a metadata mining module 234, a report processing module 236, a data characterization module 238, a search results correlation module 240, a SQL query processing module 242, an access frequency module 244, and an external enrichment module 246. Each of these modules is configured to perform at least one unsupervised learning technique.

Unsupervised learning techniques generally seek to summarize and explain key features of a data set. Non-limiting examples of unsupervised techniques include hidden Markov models, blind signal separation using feature extraction techniques for dimensionality reduction, and each of the techniques performed by the modules of the unsupervised learning module 208 (cluster analysis, mining metadata from the data in the unstructured data set, identifying relationships in data of the unstructured data set based on one or more of analyzing process reports and analyzing process SQL queries, identifying relationships in data of the unstructured data set by identifying semantic distances between data in the unstructured data set, using statistical data to determine a relationship between data in the unstructured data set, identifying relationships in data of the unstructured data set based on analyzing the access frequency of data of the unstructured data set, querying external data sources to determine a relationship between data in the unstructured data set, and text search results correlation).

As mentioned, generally the unsupervised learning module 208 can determine relationships between data 110 loaded by the load module 204 into an unstructured data set. For instance, the unsupervised learning module 208 can connect data based on confidence intervals, confidence metrics, distances, or the like indicating the proximity measures and metrics inherent in the unstructured data set, such as schema and Entity Relationship Descriptions (ERD), integrity constraints, foreign key and primary key relationships, parsing SQL queries, reports, spreadsheets, data warehouse information, or the like. For example, the unsupervised learning module 208 may derive one or more relationships across heterogeneous data sets based on probabilistic relationships derived from machine learning such as the unsupervised learning module 208. The unsupervised learning module 208 may determine, at a feature level or the like, the distance between data points based on one or more probabilistic relationships derived from machine learning, such as the unsupervised learning module 208. In addition to identifying simple relationships between data element, the unsupervised learning module 208 may also determine a chain or tree comprising multiple relationships between different data elements.

In some embodiments, as part of one or more unstructured learning technique the unsupervised learning module 208 may establish a confidence value, a confidence metric, a distance, or the like (collectively "confidence metric") through clustering and/or other machine learning techniques (e.g., the unsupervised learning module 208, the supervised learning module 210) that a certain field belongs to a feature, is associated or related to other data, or the like. For example, if the load module 204 and/or the supervised learning module 206 finds a "ship to zip code" and a "sold to zip code" in two different tables, the load module 204 and/or the supervised learning module 206 may determine certain confidence metrics that they are the same, are related, or the like.

In some unsupervised learning techniques, the unsupervised learning module 208 may determine a confidence that data 110 of an instance belongs together, is related, or the like. The unsupervised learning module 208 may determine that a person and a zip code in one table and a customer number and zip code in another table, belong together and thus join these instances or rows together and provide a confidence metric behind the join. The load module 204 or the unsupervised learning module 208 may store a confidence metric representing a likelihood that a field belongs to an instance and/or a different confidence value that the field belongs in a feature. The load module 204 and/or the supervised learning module 206 may use the confidence values, confidence metrics, or distances to determine an intersection between the row and the column, indicating where to put the field with confidence so that the field may be fed to and processed by the supervised learning module 206.

In this manner, the unsupervised learning module 298 and/or the supervised learning module 206 may eliminate a transformation step in data warehousing and replace the precision and deterministic behavior with an imprecise, probabilistic behavior (e.g., store the data in an unstructured or semi-structured manner). Maintaining data in an unstructured or semi-structured format, without transforming the data may allow the load module 204 and/or the supervised learning module 206 to identify signal that would otherwise have been eliminated by a manual transformation, may eliminate the effort of performing the manual transformation, or the like. The unsupervised learning module 208 and/or the supervised learning module 206 may not only automate and make business intelligence more efficient, but may also make business intelligence more effective due to the signal component that may have been erased through a manual transformations.

Referring still to FIG. 2B, in some unsupervised learning techniques, the unsupervised module 206 may make a first pass of the data to identify a first set of relationships, distances, and/or confidences that satisfy a simplicity threshold. For example, unique data, such as customer identifiers, phone numbers, zip codes, or the like may be relatively easy to connect without exhaustive processing. The unsupervised learning module 208, in a further embodiment, may make a second pass of data that is unable to be processed by the unsupervised learning module 208 in the first pass (e.g., data that fails to satisfy the simplicity threshold, is more difficult to connect, or the like).

For the remaining data in the second pass, the unsupervised learning module 208 may perform an exhaustive analysis, analyzing each potential connection or relationship between different data elements. For example, the unsupervised learning module 208 may perform additional unsupervised learning techniques (e.g., cross product, a Cartesian joinder, or the like) for the remaining data in the second pass (e.g., analyzing each possible data connection or combination for the remaining data), thereby identifying probabilities or confidences of which connections or combinations are valid, should be maintained, or the like. In this manner, the unsupervised learning module 208 may overcome computational complexity by approaching a logarithmic problem in a linear manner. In some embodiments, the unsupervised learning module 208 and the supervised learning module 206, using the techniques described herein may repeatedly, substantially continuously, and/or indefinitely process data over time, continuously refining accuracy of connections and combinations.

More particular reference will not be made to each of the modules shown in FIG. 2B and each of the unsupervised learning techniques performed by each. As shown, in one embodiment, the unsupervised learning module 208 includes a clustering module 230. The clustering module 230 can be configured to perform one or more clustering analysis on the unstructured data loaded by the load module 204. Clustering involves grouping a set of objects in such a way that objects in the same group (cluster) are more similar, in at least one sense, to each other than to those in other clusters. Non-limiting examples of clustering algorithms include hierarchical clustering, k-means algorithm, kernel-based clustering algorithms, density-based clustering algorithms, spectral clustering algorithms. In one embodiment, the clustering module 230 utilizes decision tree clustering with pseudo labels.

In certain embodiments, the clustering module 230 identifies one or more key concepts to cluster around. These key concepts may be based of the key concept or business objective of the data intelligence module 102, as previously mentioned. In some instances, the clustering module 230 may additionally or alternatively cluster around a column, row, or other data feature that have the highest or a high degree of uniqueness.

The clustering module 230 may use focal points, clusters, or the like to determine relationships between, distances between, and/or confidences for data. By using focal points, clustering, or the like to break up large amounts of data, the unsupervised learning module 208 may efficiently determine relationships, distances, and/or confidences for the data.

As mentioned, the unsupervised learning module 208 may utilize multiple unsupervised learning techniques to assemble an organized data set. In one embodiment, the unsupervised learning module 208 uses at least one clustering technique to assemble each organized data set. In other embodiments, some organized data sets may be assembled without using a clustering technique.

In certain embodiments, the unsupervised learning module 208 includes a semantic distance module 232. The semantic distance module is configured to identify the meaning in language and words using in the unstructured data of the unstructured data set and use that meaning to identify relationships between data elements.

In certain embodiments, the unsupervised learning module 208 includes a metadata mining module 234. The metadata mining 234 module is configured to data mine declared metadata to identify relationships between metadata and data described by the metadata. For example, the metadata mining module 234 may identify table, row, and column names and draw relationships between them.

In certain embodiments, the unsupervised learning module 208 includes a report processing module 236. The report processing module 236 is configured to analyze and/or read reports and other documents. The report processing module 236 can identify associations and patterns in these documents that indicate how the data in the unstructured data set is organized. These associations and patterns can be used to identify relationships between data elements in the unstructured data set.

In certain embodiments, the unsupervised learning module 208 includes a data characterization module 238. The data characterization module 238 is configured to use statistical data to ascertain the likelihood of similarities across a column/row family. For example, the data characterization module 238 can calculate the maximum and minimum values in a column/row, the average column length, and the number of distinct values in a column. These statistics can assist the unsupervised learning module to identify the likelihood that two or more columns/row are related. For instance, two data sets that have a maximum value of 10 and 10,000, respectively, may be less likely to be related than two data sets that have identical maximum values.

In certain embodiments, the unsupervised learning module 208 includes a search results correlation module 240. The search results correlation module 240 is configured to correlate data based on common text search results. These search results may include minor text and spelling variations for each word. Accordingly, the search results correlation module 240 may identify words that may be a variant, abbreviation, misspelling, conjugation, or derivation of other words. These identifications may be used by other unsupervised learning techniques.

In certain embodiments, the unsupervised learning module 208 includes a SQL processing module 242. The search results correlation module 242 is configured to harvest queries in a live database, including SQL queries. These queries and the results of such queries can be utilized to determine or define a distance between relationships within a data set. Similarly, the unsupervised learning module 208 or SQL processing module 242 may harvest SQL statements or other data in real-time from a running database, database manager, or other data source 104. The SQL processing module 242 may parse and/or analyze SQL queries to determine relationships. For example, a WHERE statement, a JOIN statement, or the like may relate certain features of data. The load module 204, in a further embodiment, may use data definition metadata (e.g., primary keys, foreign keys, feature names, or the like) to determine relationships.

In certain embodiments, the unsupervised learning module 208 includes an access frequency module 244. The access frequency module 244 is configured to identify correlations between data based on the frequency at which data is accesses, what data is accessed at the same time, access count, time of day data is accessed, and the like. For example, the access frequency module 244 can target highly accessed data first and use access patterns to determine possible relationships. More specifically, the access frequency module 244 can poll a database system's buffer cache metrics for highly accessed database blocks and store that access pattern information in the data set to be used to identify relationships between the highly accessed data.

In certain embodiments, the unsupervised learning module 208 includes an external enrichment module 246. The external enrichment module 246 is configured to access external sources if the confidence metric between features of a data set is below a threshold. Non-limiting examples of external sources include the Internet, an Internet search engine, an online encyclopedia or reference site, or the like. For example if a telephone area code column is not related to other columns it may be queried to an external source to establish relationships between telephone area codes and zip codes or mailing addresses.

While not an unsupervised learning technique, the unsupervised learning module 208 can be configured to query the user (ask a human) for information that is lacking or for assistance in determining relationships between features of the unstructured data set.

In addition to the use of unsupervised learning techniques, the unsupervised learning module 208 can be aided in determining relationships between data elements of the unstructured data set and in assembling organized data sets by the supervised learning module 206. As mentioned, the organized data set(s) assembled by the unsupervised learning module 206 can be evaluated by the supervised learning module 206. Using these evaluations, the unsupervised learning module 208 can identify which relationships are more likely and which are less like. The unsupervised learning module 208 can use that information to improve the accuracy of its processes.

Furthermore, in some embodiments, the unsupervised learning module 208 may use a machine learning ensemble, such as predictive program code, as an input to unsupervised learning 208 to determine probabilistic relationships between data points. The unsupervised learning module 208 may use relevant influence factors from supervised learning 210 (e.g., a machine learning ensemble or other predictive program code) to enhance unsupervised 208 mining activities in defining the distance between data points in a data set. The unsupervised learning module 208 may define the confidence that a data element is associated with a specific instance, with a specific feature, or the like.

Figure 3:
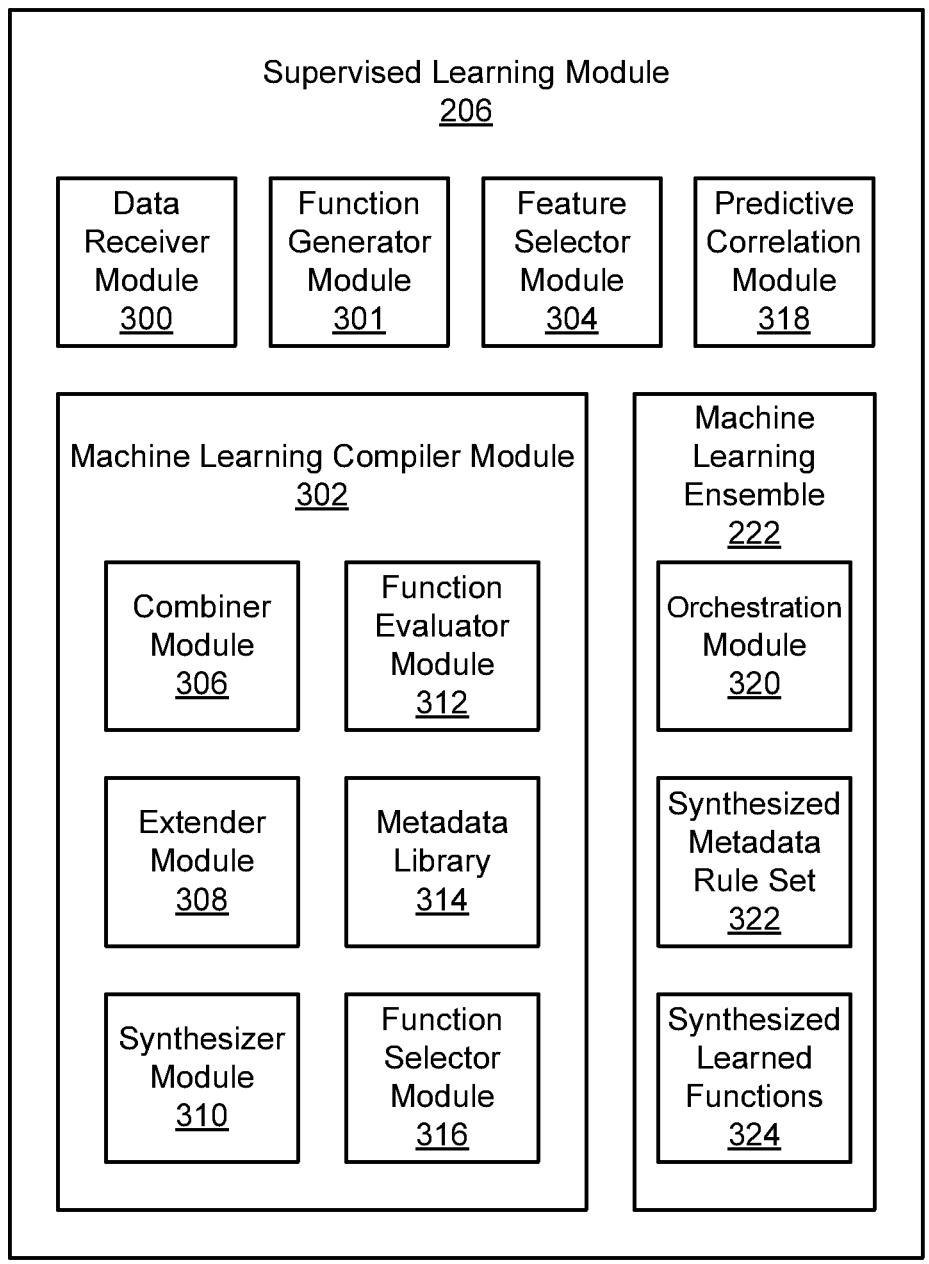
FIG. 3 is a schematic block diagram illustrating one embodiment of a supervised learning module.

FIG. 3 depicts one embodiment of a supervised learning module 206. As mentioned, the supervised learning module configured to generate one or more machine learning ensembles 222 of learned functions based on the organized data set(s) assembled by the unsupervised learning module 208. In the depicted embodiment, the supervised learning module 206 includes a data receiver module 300, a function generator module 301, a machine learning compiler module 302, a feature selector module 304 a predictive correlation module 318, and a machine learning ensemble 222. The machine learning compiler module 302, in the depicted embodiment, includes a combiner module 306, an extender module 308, a synthesizer module 310, a function evaluator module 312, a metadata library 314, and a function selector module 316. The machine learning ensemble 222, in the depicted embodiment, includes an orchestration module 320, a synthesized metadata rule set 322, and synthesized learned functions 324.

The data receiver module 300, in certain embodiments, is configured to receive data from the organized data set, including training data, test data, workload data, or the like, from a client 104, from the load module 204, or the unsupervised learning module 208, either directly or indirectly. The data receiver module 300, in various embodiments, may receive data over a local channel 108 such as an API, a shared library, a hardware command interface, or the like; over a data network 106 such as wired or wireless LAN, WAN, the Internet, a serial connection, a parallel connection, or the like. In certain embodiments, the data receiver module 300 may receive data indirectly from a client 104, from the load module 204, the unsupervised learning module 208 or the like, through an intermediate module that may pre-process, reformat, or otherwise prepare the data for the supervised learning module 206. The data receiver module 300 may support structured data, unstructured data, semi-structured data, or the like.

One type of data that the data receiver module 300 may receive, as part of a new ensemble request or the like, is initialization data. The supervised learning module 206, in certain embodiments, may use initialization data to train and test learned functions from which the supervised learning module 206 may build a machine learning ensemble 222. Initialization data may comprise the trial data set, the organized data set, historical data, statistics, Big Data, customer data, marketing data, computer system logs, computer application logs, data networking logs, or other data that a client 104 provides to the data receiver module 300 with which to build, initialize, train, and/or test a machine learning ensemble 222.

Another type of data that the data receiver module 300 may receive, as part of an analysis request or the like, is workload data. The supervised learning module 206, in certain embodiments, may process workload data using a machine learning ensemble 222 to obtain a result, such as a classification, a confidence metric, an inferred function, a regression function, an answer, a prediction, a recognized pattern, a rule, a recommendation, an evaluation, or the like. Workload data for a specific machine learning ensemble 222, in one embodiment, has substantially the same format as the initialization data used to train and/or evaluate the machine learning ensemble 222. For example, initialization data and/or workload data may include one or more features. As used herein, a feature may comprise a column, category, data type, attribute, characteristic, label, or other grouping of data. For example, in embodiments where initialization data and/or workload data that is organized in a table format, a column of data may be a feature. Initialization data and/or workload data may include one or more instances of the associated features. In a table format, where columns of data are associated with features, a row of data is an instance.

As described below with regard to FIG. 4, in one embodiment, the data receiver module 300 may maintain client data (including the organized data set), such as initialization data and/or workload data, in a data repository 406, where the function generator module 301, the machine learning compiler module 302, or the like may access the data. In certain embodiments, as described below, the function generator module 301 and/or the machine learning compiler module 302 may divide initialization data into subsets, using certain subsets of data as training data for generating and training learned functions and using certain subsets of data as test data for evaluating generated learned functions.

The function generator module 301, in certain embodiments, is configured to generate a plurality of learned functions based on training data from the data receiver module 300. A learned function, as used herein, comprises a computer readable code that accepts an input and provides a result. A learned function may comprise a compiled code, a script, text, a data structure, a file, a function, or the like. In certain embodiments, a learned function may accept instances of one or more features as input, and provide a result, such as a classification, a confidence metric, an inferred function, a regression function, an answer, a prediction, a recognized pattern, a rule, a recommendation, an evaluation, or the like. In another embodiment, certain learned functions may accept instances of one or more features as input, and provide a subset of the instances, a subset of the one or more features, or the like as an output. In a further embodiment, certain learned functions may receive the output or result of one or more other learned functions as input, such as a Bayes classifier, a Boltzmann machine, or the like.

The function generator module 301 may generate learned functions from multiple different machine learning classes, models, or algorithms. For example, the function generator module 301 may generate decision trees; decision forests; kernel classifiers and regression machines with a plurality of reproducing kernels; non-kernel regression and classification machines such as logistic, CART, multi-layer neural nets with various topologies; Bayesian-type classifiers such as Nave Bayes and Boltzmann machines; logistic regression; multinomial logistic regression; probit regression; AR; MA; ARMA; ARCH; GARCH; VAR; survival or duration analysis; MARS; radial basis functions; support vector machines; k-nearest neighbors; geospatial predictive modeling; and/or other classes of learned functions.

In one embodiment, the function generator module 301 generates learned functions pseudo-randomly, without regard to the effectiveness of the generated learned functions, without prior knowledge regarding the suitability of the generated learned functions for the associated training data, or the like. For example, the function generator module 301 may generate a total number of learned functions that is large enough that at least a subset of the generated learned functions are statistically likely to be effective. As used herein, pseudo-randomly indicates that the function generator module 301 is configured to generate learned functions in an automated manner, without input or selection of learned functions, machine learning classes or models for the learned functions, or the like by a Data Scientist, expert, or other user.

The function generator module 301, in certain embodiments, generates as many learned functions as possible for a requested machine learning ensemble 222, given one or more parameters or limitations. A client 104 may provide a parameter or limitation for learned function generation as part of a new ensemble request or the like to an interface module 402 as described below with regard to FIG. 4, such as an amount of time; an allocation of system resources such as a number of processor nodes or cores, or an amount of volatile memory; a number of learned functions; runtime constraints on the requested ensemble 222 such as an indicator of whether or not the requested ensemble 222 should provide results in real-time; and/or another parameter or limitation from a client 104.

The number of learned functions that the function generator module 301 may generate for building a machine learning ensemble 222 may also be limited by capabilities of the system 100, such as a number of available processors or processor cores, a current load on the system 100, a price of remote processing resources over the data network 106; or other hardware capabilities of the system 100 available to the function generator module 301. The function generator module 301 may balance the hardware capabilities of the system 100 with an amount of time available for generating learned functions and building a machine learning ensemble 222 to determine how many learned functions to generate for the machine learning ensemble 222.

In one embodiment, the function generator module 301 may generate at least 50 learned functions for a machine learning ensemble 222. In a further embodiment, the function generator module 301 may generate hundreds, thousands, or millions of learned functions, or more, for a machine learning ensemble 222. By generating an unusually large number of learned functions from different classes without regard to the suitability or effectiveness of the generated learned functions for training data, in certain embodiments, the function generator module 301 ensures that at least a subset of the generated learned functions, either individually or in combination, are useful, suitable, and/or effective for the training data without careful curation and fine tuning by a Data Scientist or other expert.

Similarly, by generating learned functions from different machine learning classes without regard to the effectiveness or the suitability of the different machine learning classes for training data, the function generator module 301, in certain embodiments, may generate learned functions that are useful, suitable, and/or effective for the training data due to the sheer amount of learned functions generated from the different machine learning classes. This brute force, trial-and-error approach to generating learned functions, in certain embodiments, eliminates or minimizes the role of a Data Scientist or other expert in generation of a machine learning ensemble 222.

The function generator module 301, in certain embodiments, divides initialization data from the data receiver module 300 into various subsets of training data, and may use different training data subsets, different combinations of multiple training data subsets, or the like to generate different learned functions. The function generator module 301 may divide the initialization data into training data subsets by feature, by instance, or both. For example, a training data subset may comprise a subset of features of initialization data, a subset of features of initialization data, a subset of both features and instances of initialization data, or the like. Varying the features and/or instances used to train different learned functions, in certain embodiments, may further increase the likelihood that at least a subset of the generated learned functions are useful, suitable, and/or effective. In a further embodiment, the function generator module 301 ensures that the available initialization data is not used in its entirety as training data for any one learned function, so that at least a portion of the initialization data is available for each learned function as test data, which is described in greater detail below with regard to the function evaluator module 312 of FIG. 3.

In one embodiment, the function generator module 301 may also generate additional learned functions in cooperation with the machine learning compiler module 302. The function generator module 301 may provide a learned function request interface, allowing the machine learning compiler module 302 or another module, a client 104, or the like to send a learned function request to the function generator module 301 requesting that the function generator module 301 generate one or more additional learned functions. In one embodiment, a learned function request may include one or more attributes for the requested one or more learned functions. For example, a learned function request, in various embodiments, may include a machine learning class for a requested learned function, one or more features for a requested learned function, instances from initialization data to use as training data for a requested learned function, runtime constraints on a requested learned function, or the like. In another embodiment, a learned function request may identify initialization data, training data, or the like for one or more requested learned functions and the function generator module 301 may generate the one or more learned functions pseudo-randomly, as described above, based on the identified data.

The machine learning compiler module 302, in one embodiment, is configured to form a machine learning ensemble 222 using learned functions from the function generator module 301. As used herein, a machine learning ensemble 222 comprises an organized set of a plurality of learned functions. Providing a classification, a confidence metric, an inferred function, a regression function, an answer, a prediction, a recognized pattern, a rule, a recommendation, or another result using a machine learning ensemble 222, in certain embodiments, may be more accurate than using a single learned function.

The machine learning compiler module 302 is described in greater detail below with regard to FIG. 3. The machine learning compiler module 302, in certain embodiments, may combine and/or extend learned functions to form new learned functions, may request additional learned functions from the function generator module 301, or the like for inclusion in a machine learning ensemble 222. In one embodiment, the machine learning compiler module 302 evaluates learned functions from the function generator module 301 using test data to generate evaluation metadata. The machine learning compiler module 302, in a further embodiment, may evaluate combined learned functions, extended learned functions, combined-extended learned functions, additional learned functions, or the like using test data to generate evaluation metadata.

The machine learning compiler module 302, in certain embodiments, maintains evaluation metadata in a metadata library 314, as described below with regard to FIGS. 3 and 4. The machine learning compiler module 302 may select learned functions (e.g. learned functions from the function generator module 301, combined learned functions, extended learned functions, learned functions from different machine learning classes, and/or combined-extended learned functions) for inclusion in a machine learning ensemble 222 based on the evaluation metadata. In a further embodiment, the machine learning compiler module 302 may synthesize the selected learned functions into a final, synthesized function or function set for a machine learning ensemble 222 based on evaluation metadata. The machine learning compiler module 302, in another embodiment, may include synthesized evaluation metadata in a machine learning ensemble 222 for directing data through the machine learning ensemble 222 or the like.

In one embodiment, the feature selector module 304 determines which features of initialization data to use in the machine learning ensemble 222, and in the associated learned functions, and/or which features of the initialization data to exclude from the machine learning ensemble 222, and from the associated learned functions. As described above, initialization data, and the training data and test data derived from the initialization data, may include one or more features. Learned functions and the machine learning ensembles 222 that they form are configured to receive and process instances of one or more features. Certain features may be more predictive than others, and the more features that the machine learning compiler module 302 processes and includes in the generated machine learning ensemble 222, the more processing overhead used by the machine learning compiler module 302, and the more complex the generated machine learning ensemble 222 becomes. Additionally, certain features may not contribute to the effectiveness or accuracy of the results from a machine learning ensemble 222, but may simply add noise to the results.

The feature selector module 304, in one embodiment, cooperates with the function generator module 301 and the machine learning compiler module 302 to evaluate the effectiveness of various features, based on evaluation metadata from the metadata library 314 described below. For example, the function generator module 301 may generate a plurality of learned functions for various combinations of features, and the machine learning compiler module 302 may evaluate the learned functions and generate evaluation metadata. Based on the evaluation metadata, the feature selector module 304 may select a subset of features that are most accurate or effective, and the machine learning compiler module 302 may use learned functions that utilize the selected features to build the machine learning ensemble 222. The feature selector module 304 may select features for use in the machine learning ensemble 222 based on evaluation metadata for learned functions from the function generator module 301, combined learned functions from the combiner module 306, extended learned functions from the extender module 308, combined extended functions, synthesized learned functions from the synthesizer module 310, or the like.

In a further embodiment, the feature selector module 304 may cooperate with the machine learning compiler module 302 to build a plurality of different machine learning ensembles 222 for the same initialization data or training data, each different machine learning ensemble 222 utilizing different features of the initialization data or training data. The machine learning compiler module 302 may evaluate each different machine learning ensemble 222, using the function evaluator module 312 described below, and the feature selector module 304 may select the machine learning ensemble 222 and the associated features which are most accurate or effective based on the evaluation metadata for the different machine learning ensembles 222. In certain embodiments, the machine learning compiler module 302 may generate tens, hundreds, thousands, millions, or more different machine learning ensembles 222 so that the feature selector module 304 may select an optimal set of features (e.g. the most accurate, most effective, or the like) with little or no input from a Data Scientist, expert, or other user in the selection process.

In one embodiment, the machine learning compiler module 302 may generate a machine learning ensemble 222 for each possible combination of features from which the feature selector module 304 may select. In a further embodiment, the machine learning compiler module 302 may begin generating machine learning ensembles 222 with a minimal number of features, and may iteratively increase the number of features used to generate machine learning ensembles 222 until an increase in effectiveness or usefulness of the results of the generated machine learning ensembles 222 fails to satisfy a feature effectiveness threshold. By increasing the number of features until the increases stop being effective, in certain embodiments, the machine learning compiler module 302 may determine a minimum effective set of features for use in a machine learning ensemble 222, so that generation and use of the machine learning ensemble 222 is both effective and efficient. The feature effectiveness threshold may be predetermined or hard coded, may be selected by a client 104 as part of a new ensemble request or the like, may be based on one or more parameters or limitations, or the like.

During the iterative process, in certain embodiments, once the feature selector module 304 determines that a feature is merely introducing noise, the machine learning compiler module 302 excludes the feature from future iterations, and from the machine learning ensemble 222. In one embodiment, a client 104 may identify one or more features as required for the machine learning ensemble 222, in a new ensemble request or the like. The feature selector module 304 may include the required features in the machine learning ensemble 222, and select one or more of the remaining optional features for inclusion in the machine learning ensemble 222 with the required features.

In a further embodiment, based on evaluation metadata from the metadata library 314, the feature selector module 304 determines which features from initialization data and/or training data are adding noise, are not predictive, are the least effective, or the like, and excludes the features from the machine learning ensemble 222. In other embodiments, the feature selector module 304 may determine which features enhance the quality of results, increase effectiveness, or the like, and selects the features for the machine learning ensemble 222.

In one embodiment, the feature selector module 304 causes the machine learning compiler module 302 to repeat generating, combining, extending, and/or evaluating learned functions while iterating through permutations of feature sets. At each iteration, the function evaluator module 312 may determine an overall effectiveness of the learned functions in aggregate for the current iteration's selected combination of features. Once the feature selector module 304 identifies a feature as noise introducing, the feature selector module may exclude the noisy feature and the machine learning compiler module 302 may generate a machine learning ensemble 222 without the excluded feature. In one embodiment, the predictive correlation module 318 determines one or more features, instances of features, or the like that correlate with higher confidence metrics (e.g. that are most effective in predicting results with high confidence). The predictive correlation module 318 may cooperate with, be integrated with, or otherwise work in concert with the feature selector module 304 to determine one or more features, instances of features, or the like that correlate with higher confidence metrics. For example, as the feature selector module 304 causes the machine learning compiler module 302 to generate and evaluate learned functions with different sets of features, the predictive correlation module 318 may determine which features and/or instances of features correlate with higher confidence metrics, are most effective, or the like based on metadata from the metadata library 314.

The predictive correlation module 318, in certain embodiments, is configured to harvest metadata regarding which features correlate to higher confidence metrics, to determine which feature was predictive of which outcome or result, or the like. In one embodiment, the predictive correlation module 318 determines the relationship of a feature's predictive qualities for a specific outcome or result based on each instance of a particular feature. In other embodiments, the predictive correlation module 318 may determine the relationship of a feature's predictive qualities based on a subset of instances of a particular feature. For example, the predictive correlation module 318 may discover a correlation between one or more features and the confidence metric of a predicted result by attempting different combinations of features and subsets of instances within an individual feature's dataset, and measuring an overall impact on predictive quality, accuracy, confidence, or the like. The predictive correlation module 318 may determine predictive features at various granularities, such as per feature, per subset of features, per instance, or the like.

In one embodiment, the predictive correlation module 318 determines one or more features with a greatest contribution to a predicted result or confidence metric as the machine learning compiler module 302 forms the machine learning ensemble 222, based on evaluation metadata from the metadata library 314, or the like. For example, the machine learning compiler module 302 may build one or more synthesized learned functions 324 that are configured to provide one or more features with a greatest contribution as part of a result. In another embodiment, the predictive correlation module 318 may determine one or more features with a greatest contribution to a predicted result or confidence metric dynamically at runtime as the machine learning ensemble 222 determines the predicted result or confidence metric. In such embodiments, the predictive correlation module 318 may be part of, integrated with, or in communication with the machine learning ensemble 222. The predictive correlation module 318 may cooperate with the machine learning ensemble 222, such that the machine learning ensemble 222 provides a listing of one or more features that provided a greatest contribution to a predicted result or confidence metric as part of a response to an analysis request.

In determining features that are predictive, or that have a greatest contribution to a predicted result or confidence metric, the predictive correlation module 318 may balance a frequency of the contribution of a feature and/or an impact of the contribution of the feature. For example, a certain feature or set of features may contribute to the predicted result or confidence metric frequently, for each instance or the like, but have a low impact. Another feature or set of features may contribute relatively infrequently, but has a very high impact on the predicted result or confidence metric (e.g. provides at or near 100% confidence or the like). While the predictive correlation module 318 is described herein as determining features that are predictive or that have a greatest contribution, in other embodiments, the predictive correlation module 318 may determine one or more specific instances of a feature that are predictive, have a greatest contribution to a predicted result or confidence metric, or the like.

In the depicted embodiment, the machine learning compiler module 302 includes a combiner module 306. The combiner module 306 combines learned functions, forming sets, strings, groups, trees, or clusters of combined learned functions. In certain embodiments, the combiner module 306 combines learned functions into a prescribed order, and different orders of learned functions may have different inputs, produce different results, or the like. The combiner module 306 may combine learned functions in different combinations. For example, the combiner module 306 may combine certain learned functions horizontally or in parallel, joined at the inputs and at the outputs or the like, and may combine certain learned functions vertically or in series, feeding the output of one learned function into the input of another learned function.

The combiner module 306 may determine which learned functions to combine, how to combine learned functions, or the like based on evaluation metadata for the learned functions from the metadata library 314, generated based on an evaluation of the learned functions using test data, as described below with regard to the function evaluator module 312. The combiner module 306 may request additional learned functions from the function generator module 301, for combining with other learned functions. For example, the combiner module 306 may request a new learned function with a particular input and/or output to combine with an existing learned function, or the like.

While the combining of learned functions may be informed by evaluation metadata for the learned functions, in certain embodiments, the combiner module 306 combines a large number of learned functions pseudo-randomly, forming a large number of combined functions. For example, the combiner module 306, in one embodiment, may determine each possible combination of generated learned functions, as many combinations of generated learned functions as possible given one or more limitations or constraints, a selected subset of combinations of generated learned functions, or the like, for evaluation by the function evaluator module 312. In certain embodiments, by generating a large number of combined learned functions, the combiner module 306 is statistically likely to form one or more combined learned functions that are useful and/or effective for the training data.

In the depicted embodiment, the machine learning compiler module 302 includes an extender module 308. The extender module 308, in certain embodiments, is configured to add one or more layers to a learned function. For example, the extender module 308 may extend a learned function or combined learned function by adding a probabilistic model layer, such as a Bayesian belief network layer, a Bayes classifier layer, a Boltzmann layer, or the like.

Certain classes of learned functions, such as probabilistic models, may be configured to receive either instances of one or more features as input, or the output results of other learned functions, such as a classification and a confidence metric, an inferred function, a regression function, an answer, a prediction, a recognized pattern, a rule, a recommendation, an evaluation, or the like. The extender module 308 may use these types of learned functions to extend other learned functions. The extender module 308 may extend learned functions generated by the function generator module 301 directly, may extend combined learned functions from the combiner module 306, may extend other extended learned functions, may extend synthesized learned functions from the synthesizer module 310, or the like.

In one embodiment, the extender module 308 determines which learned functions to extend, how to extend learned functions, or the like based on evaluation metadata from the metadata library 314. The extender module 308, in certain embodiments, may request one or more additional learned functions from the function generator module 301 and/or one or more additional combined learned functions from the combiner module 306, for the extender module 308 to extend.

While the extending of learned functions may be informed by evaluation metadata for the learned functions, in certain embodiments, the extender module 308 generates a large number of extended learned functions pseudo-randomly. For example, the extender module 308, in one embodiment, may extend each possible learned function and/or combination of learned functions, may extend a selected subset of learned functions, may extend as many learned functions as possible given one or more limitations or constraints, or the like, for evaluation by the function evaluator module 312. In certain embodiments, by generating a large number of extended learned functions, the extender module 308 is statistically likely to form one or more extended learned functions and/or combined extended learned functions that are useful and/or effective for the training data.

In the depicted embodiment, the machine learning compiler module 302 includes a synthesizer module 310. The synthesizer module 310, in certain embodiments, is configured to organize a subset of learned functions into the machine learning ensemble 222, as synthesized learned functions 324. In a further embodiment, the synthesizer module 310 includes evaluation metadata from the metadata library 314 of the function evaluator module 312 in the machine learning ensemble 222 as a synthesized metadata rule set 322, so that the machine learning ensemble 222 includes synthesized learned functions 324 and evaluation metadata, the synthesized metadata rule set 322, for the synthesized learned functions 324.

The learned functions that the synthesizer module 310 synthesizes or organizes into the synthesized learned functions 324 of the machine learning ensemble 222, may include learned functions directly from the function generator module 301, combined learned functions from the combiner module 306, extended learned functions from the extender module 308, combined extended learned functions, or the like. As described below, in one embodiment, the function selector module 316 selects the learned functions for the synthesizer module 310 to include in the machine learning ensemble 222. In certain embodiments, the synthesizer module 310 organizes learned functions by preparing the learned functions and the associated evaluation metadata for processing workload data to reach a result. For example, as described below, the synthesizer module 310 may organize and/or synthesize the synthesized learned functions 324 and the synthesized metadata rule set 322 for the orchestration module 320 to use to direct workload data through the synthesized learned functions 324 to produce a result.

In one embodiment, the function evaluator module 312 evaluates the synthesized learned functions 324 that the synthesizer module 310 organizes, and the synthesizer module 310 synthesizes and/or organizes the synthesized metadata rule set 322 based on evaluation metadata that the function evaluation module 312 generates during the evaluation of the synthesized learned functions 324, from the metadata library 314 or the like.

In the depicted embodiment, the machine learning compiler module 302 includes a function evaluator module 312. The function evaluator module 312 is configured to evaluate learned functions using test data, or the like. The function evaluator module 312 may evaluate learned functions generated by the function generator module 301, learned functions combined by the combiner module 306 described above, learned functions extended by the extender module 308 described above, combined extended learned functions, synthesized learned functions 324 organized into the machine learning ensemble 222 by the synthesizer module 310 described above, or the like.

Test data for a learned function, in certain embodiments, comprises a different subset of the initialization data for the learned function than the function generator module 301 used as training data. The function evaluator module 312, in one embodiment, evaluates a learned function by inputting the test data into the learned function to produce a result, such as a classification, a confidence metric, an inferred function, a regression function, an answer, a prediction, a recognized pattern, a rule, a recommendation, an evaluation, or another result.

Test data, in certain embodiments, comprises a subset of initialization data, with a feature associated with the requested result removed, so that the function evaluator module 312 may compare the result from the learned function to the instances of the removed feature to determine the accuracy and/or effectiveness of the learned function for each test instance. For example, if a client 104 has requested a machine learning ensemble 222 to predict whether a customer will be a repeat customer, and provided historical customer information as initialization data, the function evaluator module 312 may input a test data set comprising one or more features of the initialization data other than whether the customer was a repeat customer into the learned function, and compare the resulting predictions to the initialization data to determine the accuracy and/or effectiveness of the learned function.

The function evaluator module 312, in one embodiment, is configured to maintain evaluation metadata for an evaluated learned function in the metadata library 314. The evaluation metadata, in certain embodiments, comprises log data generated by the function generator module 301 while generating learned functions, the function evaluator module 312 while evaluating learned functions, or the like.

In one embodiment, the evaluation metadata includes indicators of one or more training data sets that the function generator module 301 used to generate a learned function. The evaluation metadata, in another embodiment, includes indicators of one or more test data sets that the function evaluator module 312 used to evaluate a learned function. In a further embodiment, the evaluation metadata includes indicators of one or more decisions made by and/or branches taken by a learned function during an evaluation by the function evaluator module 312. The evaluation metadata, in another embodiment, includes the results determined by a learned function during an evaluation by the function evaluator module 312. In one embodiment, the evaluation metadata may include evaluation metrics, learning metrics, effectiveness metrics, convergence metrics, or the like for a learned function based on an evaluation of the learned function. An evaluation metric, learning metrics, effectiveness metric, convergence metric, or the like may be based on a comparison of the results from a learned function to actual values from initialization data, and may be represented by a correctness indicator for each evaluated instance, a percentage, a ratio, or the like. Different classes of learned functions, in certain embodiments, may have different types of evaluation metadata.

The metadata library 314, in one embodiment, provides evaluation metadata for learned functions to the feature selector module 304, the predictive correlation module 318, the combiner module 306, the extender module 308, and/or the synthesizer module 310. The metadata library 314 may provide an API, a shared library, one or more function calls, or the like providing access to evaluation metadata. The metadata library 314, in various embodiments, may store or maintain evaluation metadata in a database format, as one or more flat files, as one or more lookup tables, as a sequential log or log file, or as one or more other data structures. In one embodiment, the metadata library 314 may index evaluation metadata by learned function, by feature, by instance, by training data, by test data, by effectiveness, and/or by another category or attribute and may provide query access to the indexed evaluation metadata. The function evaluator module 312 may update the metadata library 314 in response to each evaluation of a learned function, adding evaluation metadata to the metadata library 314 or the like.

The function selector module 316, in certain embodiments, may use evaluation metadata from the metadata library 314 to select learned functions for the combiner module 306 to combine, for the extender module 308 to extend, for the synthesizer module 310 to include in the machine learning ensemble 222, or the like. For example, in one embodiment, the function selector module 316 may select learned functions based on evaluation metrics, learning metrics, effectiveness metrics, convergence metrics, or the like. In another embodiment, the function selector module 316 may select learned functions for the combiner module 306 to combine and/or for the extender module 308 to extend based on features of training data used to generate the learned functions, or the like.

The machine learning ensemble 222, in certain embodiments, provides machine learning results for an analysis request by processing workload data of the analysis request using a plurality of learned functions (e.g., the synthesized learned functions 324). As described above, results from the machine learning ensemble 222, in various embodiments, may include a classification, a confidence metric, an inferred function, a regression function, an answer, a prediction, a recognized pattern, a rule, a recommendation, an evaluation, and/or another result. For example, in one embodiment, the machine learning ensemble 222 provides a classification and a confidence metric for each instance of workload data input into the machine learning ensemble 222, or the like. Workload data, in certain embodiments, may be substantially similar to test data, but the missing feature from the initialization data is not known, and is to be solved for by the machine learning ensemble 222. A classification, in certain embodiments, comprises a value for a missing feature in an instance of workload data, such as a prediction, an answer, or the like. For example, if the missing feature represents a question, the classification may represent a predicted answer, and the associated confidence metric may be an estimated strength or accuracy of the predicted answer. A classification, in certain embodiments, may comprise a binary value (e.g., yes or no), a rating on a scale (e.g., 4 on a scale of 1 to 5), or another data type for a feature. A confidence metric, in certain embodiments, may comprise a percentage, a ratio, a rating on a scale, or another indicator of accuracy, effectiveness, and/or confidence.

In the depicted embodiment, the machine learning ensemble 222 includes an orchestration module 320. The orchestration module 320, in certain embodiments, is configured to direct workload data through the machine learning ensemble 222 to produce a result, such as a classification, a confidence metric, an inferred function, a regression function, an answer, a prediction, a recognized pattern, a rule, a recommendation, an evaluation, and/or another result. In one embodiment, the orchestration module 320 uses evaluation metadata from the function evaluator module 312 and/or the metadata library 314, such as the synthesized metadata rule set 322, to determine how to direct workload data through the synthesized learned functions 324 of the machine learning ensemble 222. As described below with regard to FIG. 8, in certain embodiments, the synthesized metadata rule set 322 comprises a set of rules or conditions from the evaluation metadata of the metadata library 314 that indicate to the orchestration module 320 which features, instances, or the like should be directed to which synthesized learned function 324.

For example, the evaluation metadata from the metadata library 314 may indicate which learned functions were trained using which features and/or instances, how effective different learned functions were at making predictions based on different features and/or instances, or the like. The synthesizer module 310 may use that evaluation metadata to determine rules for the synthesized metadata rule set 322, indicating which features, which instances, or the like the orchestration module 320 the orchestration module 320 should direct through which learned functions, in which order, or the like. The synthesized metadata rule set 322, in one embodiment, may comprise a decision tree or other data structure comprising rules which the orchestration module 320 may follow to direct workload data through the synthesized learned functions 324 of the machine learning ensemble 222.

Figure 4:
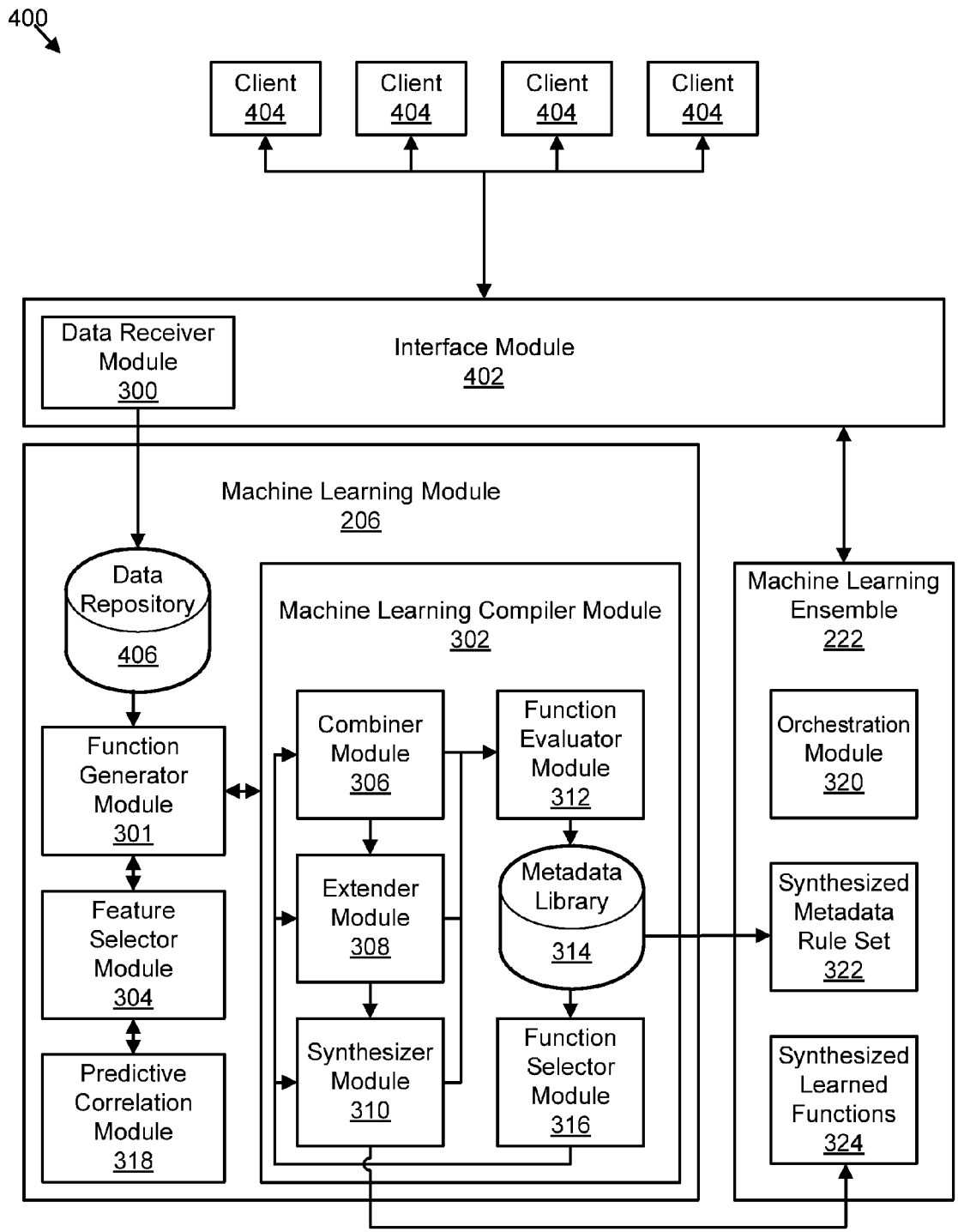
FIG. 4 is a schematic block diagram illustrating one embodiment of a system for a machine learning factory.

FIG. 4 depicts one embodiment of a system 400 for a machine learning factory. The system 400, in the depicted embodiment, includes several clients 404 in communication with an interface module 402 either locally or over a data network 106. The supervised learning module 206 of FIG. 4 is substantially similar to the supervised learning module 206 of FIG. 3, but further includes an interface module 402 and a data repository 406.

The interface module 402, in certain embodiments, is configured to receive requests from clients 404, to provide results to a client 404, or the like. The supervised learning module 206, for example, may act as a client 404, requesting a machine learning ensemble 222 from the interface module 402 or the like. The interface module 402 may provide a machine learning interface to clients 404, such as an API, a shared library, a hardware command interface, or the like, over which clients 404 may make requests and receive results. The interface module 402 may support new ensemble requests from clients 404, allowing clients 404 to request generation of a new machine learning ensemble 222 from the supervised learning module 206 or the like. As described above, a new ensemble request may include initialization data; one or more ensemble parameters; a feature, query, question or the like for which a client 404 would like a machine learning ensemble 222 to predict a result; or the like. The interface module 402 may support analysis requests for a result from a machine learning ensemble 222. As described above, an analysis request may include workload data; a feature, query, question or the like; a machine learning ensemble 222; or may include other analysis parameters.

In certain embodiments, the supervised learning module 206 may maintain a library of generated machine learning ensembles 222, from which clients 404 may request results. In such embodiments, the interface module 402 may return a reference, pointer, or other identifier of the requested machine learning ensemble 222 to the requesting client 404, which the client 404 may use in analysis requests. In another embodiment, in response to the supervised learning module 206 generating a machine learning ensemble 222 to satisfy a new ensemble request, the interface module 402 may return the actual machine learning ensemble 222 to the client 404, for the client 404 to manage, and the client 404 may include the machine learning ensemble 222 in each analysis request.

The interface module 402 may cooperate with the supervised learning module 206 to service new ensemble requests, may cooperate with the machine learning ensemble 222 to provide a result to an analysis request, or the like. The supervised learning module 206, in the depicted embodiment, includes the function generator module 301, the feature selector module 304, the predictive correlation module 318, and the machine learning compiler module 302, as described above. The supervised learning module 206, in the depicted embodiment, also includes a data repository 406.

The data repository 406, in one embodiment, stores initialization data, so that the function generator module 301, the feature selector module 304, the predictive correlation module 318, and/or the machine learning compiler module 302 may access the initialization data to generate, combine, extend, evaluate, and/or synthesize learned functions and machine learning ensembles 222. The data repository 406 may provide initialization data indexed by feature, by instance, by training data subset, by test data subset, by new ensemble request, or the like. By maintaining initialization data in a data repository 406, in certain embodiments, the supervised learning module 206 ensures that the initialization data is accessible throughout the machine learning ensemble 222 building process, for the function generator module 301 to generate learned functions, for the feature selector module 304 to determine which features should be used in the machine learning ensemble 222, for the predictive correlation module 318 to determine which features correlate with the highest confidence metrics, for the combiner module 306 to combine learned functions, for the extender module 308 to extend learned functions, for the function evaluator module 312 to evaluate learned functions, for the synthesizer module 310 to synthesize learned functions 324 and/or metadata rule sets 322, or the like.

In the depicted embodiment, the data receiver module 300 is integrated with the interface module 402, to receive initialization data, including training data and test data, from new ensemble requests. The data receiver module 300 stores initialization data in the data repository 406. The function generator module 301 is in communication with the data repository 406, in one embodiment, so that the function generator module 301 may generate learned functions based on training data sets from the data repository 406. The feature selector module 300 and/or the predictive correlation module 318, in certain embodiments, may cooperate with the function generator module 301 and/or the machine learning compiler module 302 to determine which features to use in the machine learning ensemble 222, which features are most predictive or correlate with the highest confidence metrics, or the like.

Within the machine learning compiler module 302, the combiner module 306, the extender module 308, and the synthesizer module 310 are each in communication with both the function generator module 301 and the function evaluator module 312. The function generator module 301, as described above, may generate an initial large amount of learned functions, from different classes or the like, which the function evaluator module 312 evaluates using test data sets from the data repository 406. The combiner module 306 may combine different learned functions from the function generator module 301 to form combined learned functions, which the function evaluator module 312 evaluates using test data from the data repository 406. The combiner module 306 may also request additional learned functions from the function generator module 301.

The extender module 308, in one embodiment, extends learned functions from the function generator module 301 and/or the combiner module 306. The extender module 308 may also request additional learned functions from the function generator module 301. The function evaluator module 312 evaluates the extended learned functions using test data sets from the data repository 406. The synthesizer module 310 organizes, combines, or otherwise synthesizes learned functions from the function generator module 301, the combiner module 306, and/or the extender module 308 into synthesized learned functions 324 for the machine learning ensemble 222. The function evaluator module 312 evaluates the synthesized learned functions 324, and the synthesizer module 310 organizes or synthesizes the evaluation metadata from the metadata library 314 into a synthesized metadata rule set 322 for the synthesized learned functions 324.

As described above, as the function evaluator module 312 evaluates learned functions from the function generator module 301, the combiner module 306, the extender module 308, and/or the synthesizer module 310, the function evaluator module 312 generates evaluation metadata for the learned functions and stores the evaluation metadata in the metadata library 314. In the depicted embodiment, in response to an evaluation by the function evaluator module 312, the function selector module 316 selects one or more learned functions based on evaluation metadata from the metadata library 314. For example, the function selector module 316 may select learned functions for the combiner module 306 to combine, for the extender module 308 to extend, for the synthesizer module 310 to synthesize, or the like.

Figure 5:
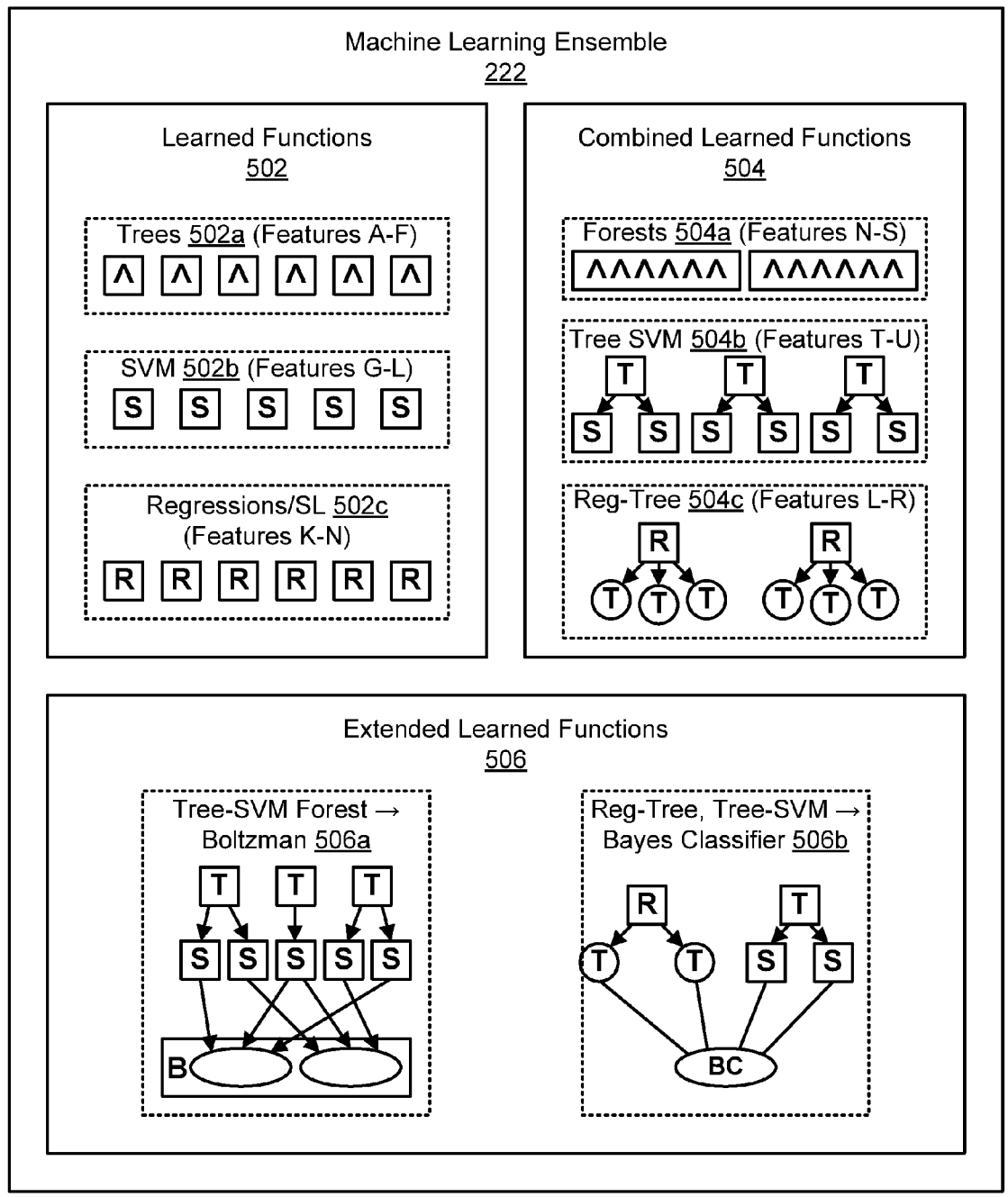
FIG. 5 is a schematic block diagram illustrating one embodiment of learned functions for a machine learning ensemble.

FIG. 5 depicts one embodiment 500 of learned functions 502, 504, 506 for a machine learning ensemble 222. The learned functions 502, 504, 506 are presented by way of example, and in other embodiments, other types and combinations of learned functions may be used, as described above. Further, in other embodiments, the machine learning ensemble 222 may include an orchestration module 320, a synthesized metadata rule set 322, or the like. In one embodiment, the function generator module 301 generates the learned functions 502. The learned functions 502, in the depicted embodiment, include various collections of selected learned functions 502 from different classes including a collection of decision trees 502a, configured to receive or process a subset A-F of the feature set of the machine learning ensemble 222, a collection of support vector machines ("SVMs") 502b with certain kernels and with an input space configured with particular subsets of the feature set G-L, and a selected group of regression models 502c, here depicted as a suite of single layer ("SL") neural nets trained on certain feature sets K-N.

The example combined learned functions 504, combined by the combiner module 306 or the like, include various instances of forests of decision trees 504a configured to receive or process features N-S, a collection of combined trees with support vector machine decision nodes 504b with specific kernels, their parameters and the features used to define the input space of features T-U, as well as combined functions 504c in the form of trees with a regression decision at the root and linear, tree node decisions at the leaves, configured to receive or process features L-R.

Component class extended learned functions 506, extended by the extender module 308 or the like, include a set of extended functions such as a forest of trees 506a with tree decisions at the roots and various margin classifiers along the branches, which have been extended with a layer of Boltzmann type Bayesian probabilistic classifiers. Extended learned function 506b includes a tree with various regression decisions at the roots, a combination of standard tree 504b and regression decision tree 504c and the branches are extended by a Bayes classifier layer trained with a particular training set exclusive of those used to train the nodes.

Figure 6:
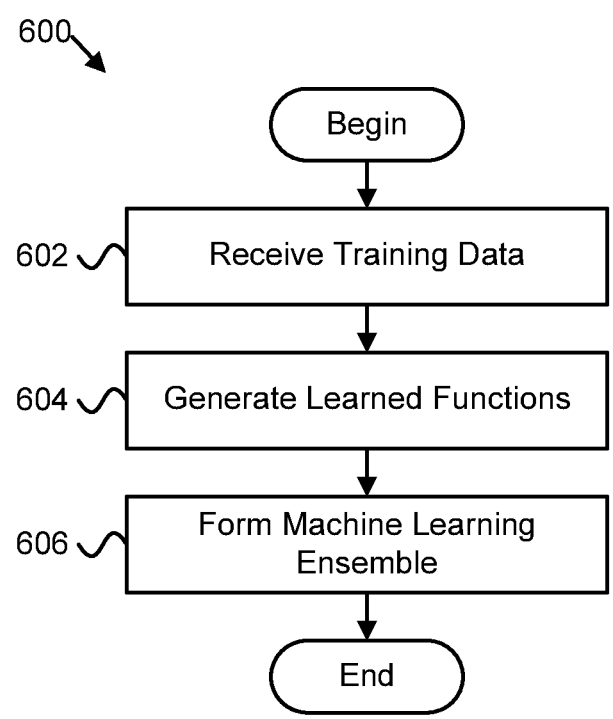
FIG. 6 is a schematic flow chart diagram illustrating one embodiment of a method for a machine learning factory.

FIG. 6 depicts one embodiment of a method 600 for a machine learning factory. The method 600 begins, and the data receiver module 300 receives 602 training data. The function generator module 301 generates 604 a plurality of learned functions from multiple classes based on the received 602 training data. The machine learning compiler module 302 forms 606 a machine learning ensemble comprising a subset of learned functions from at least two classes, and the method 600 ends.

Figure 7:
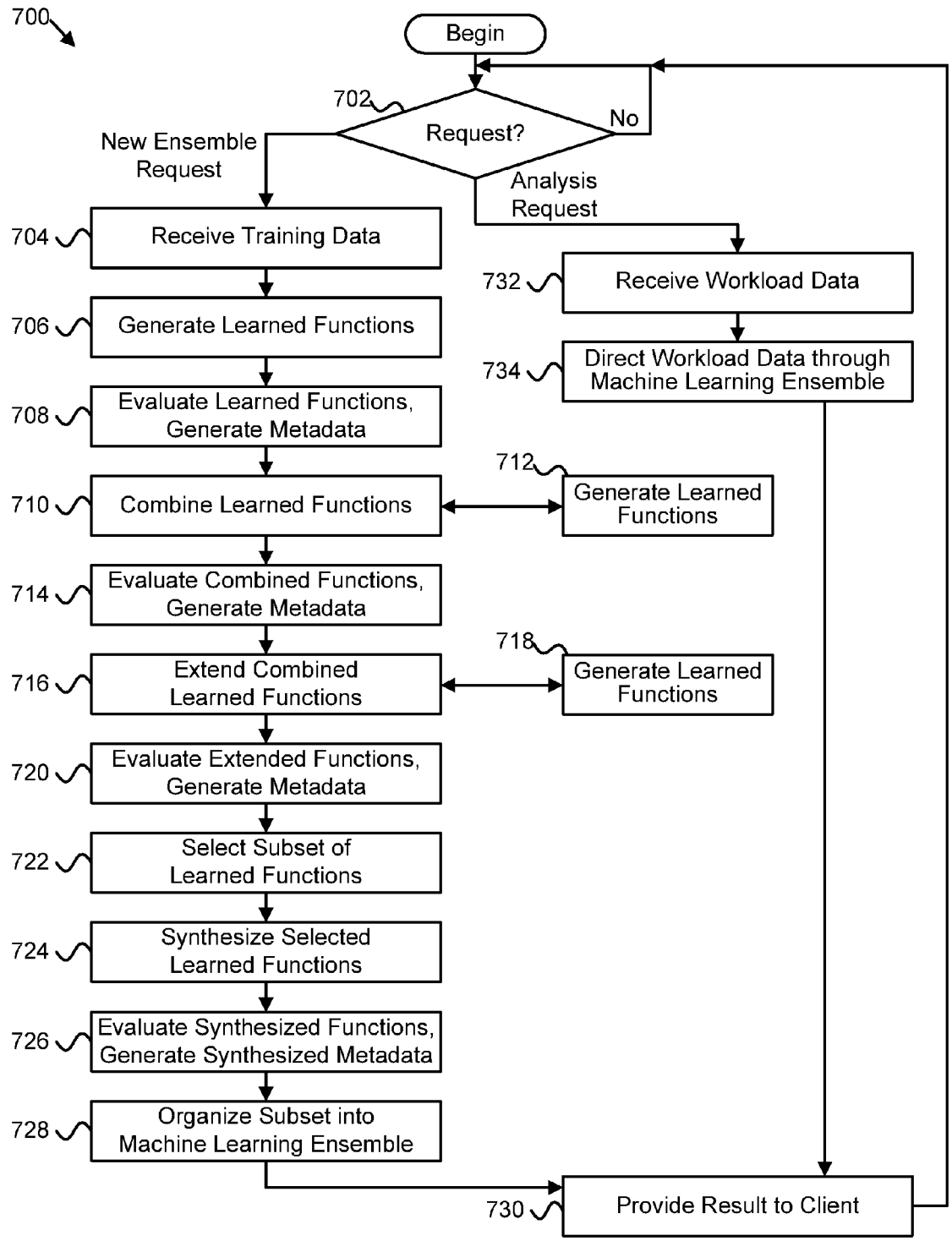
FIG. 7 is a schematic flow chart diagram illustrating another embodiment of a method for a machine learning factory.

FIG. 7 depicts another embodiment of a method 700 for a machine learning factory. The method 700 begins, and the interface module 402 monitors 702 requests until the interface module 402 receives 702 an analytics request from a client 404 or the like.

If the interface module 402 receives 702 a new ensemble request, the data receiver module 300 receives 704 training data for the new ensemble, as initialization data or the like. The function generator module 301 generates 706 a plurality of learned functions based on the received 704 training data, from different machine learning classes. The function evaluator module 312 evaluates 708 the plurality of generated 706 learned functions to generate evaluation metadata. The combiner module 306 combines 710 learned functions based on the metadata from the evaluation 708. The combiner module 306 may request that the function generator module 301 generate 712 additional learned functions for the combiner module 306 to combine.

The function evaluator module 312 evaluates 714 the combined 710 learned functions and generates additional evaluation metadata. The extender module 308 extends 716 one or more learned functions by adding one or more layers to the one or more learned functions, such as a probabilistic model layer or the like. In certain embodiments, the extender module 308 extends 716 combined 710 learned functions based on the evaluation 712 of the combined learned functions. The extender module 308 may request that the function generator module 301 generate 718 additional learned functions for the extender module 308 to extend. The function evaluator module 312 evaluates 720 the extended 716 learned functions. The function selector module 316 selects 722 at least two learned functions, such as the generated 706 learned functions, the combined 710 learned functions, the extended 716 learned functions, or the like, based on evaluation metadata from one or more of the evaluations 708, 714, 720.

The synthesizer module 310 synthesizes 724 the selected 722 learned functions into synthesized learned functions 324. The function evaluator module 312 evaluates 726 the synthesized learned functions 324 to generate a synthesized metadata rule set 322. The synthesizer module 310 organizes 728 the synthesized 724 learned functions 324 and the synthesized metadata rule set 322 into a machine learning ensemble 222. The interface module 402 provides 730 a result to the requesting client 404, such as the machine learning ensemble 222, a reference to the machine learning ensemble 222, an acknowledgment, or the like, and the interface module 402 continues to monitor 702 requests.

If the interface module 402 receives 702 an analysis request, the data receiver module 300 receives 732 workload data associated with the analysis request. The orchestration module 320 directs 734 the workload data through a machine learning ensemble 222 associated with the received 702 analysis request to produce a result, such as a classification, a confidence metric, an inferred function, a regression function, an answer, a recognized pattern, a recommendation, an evaluation, and/or another result. The interface module 402 provides 730 the produced result to the requesting client 404, and the interface module 402 continues to monitor 702 requests.

Figure 8:
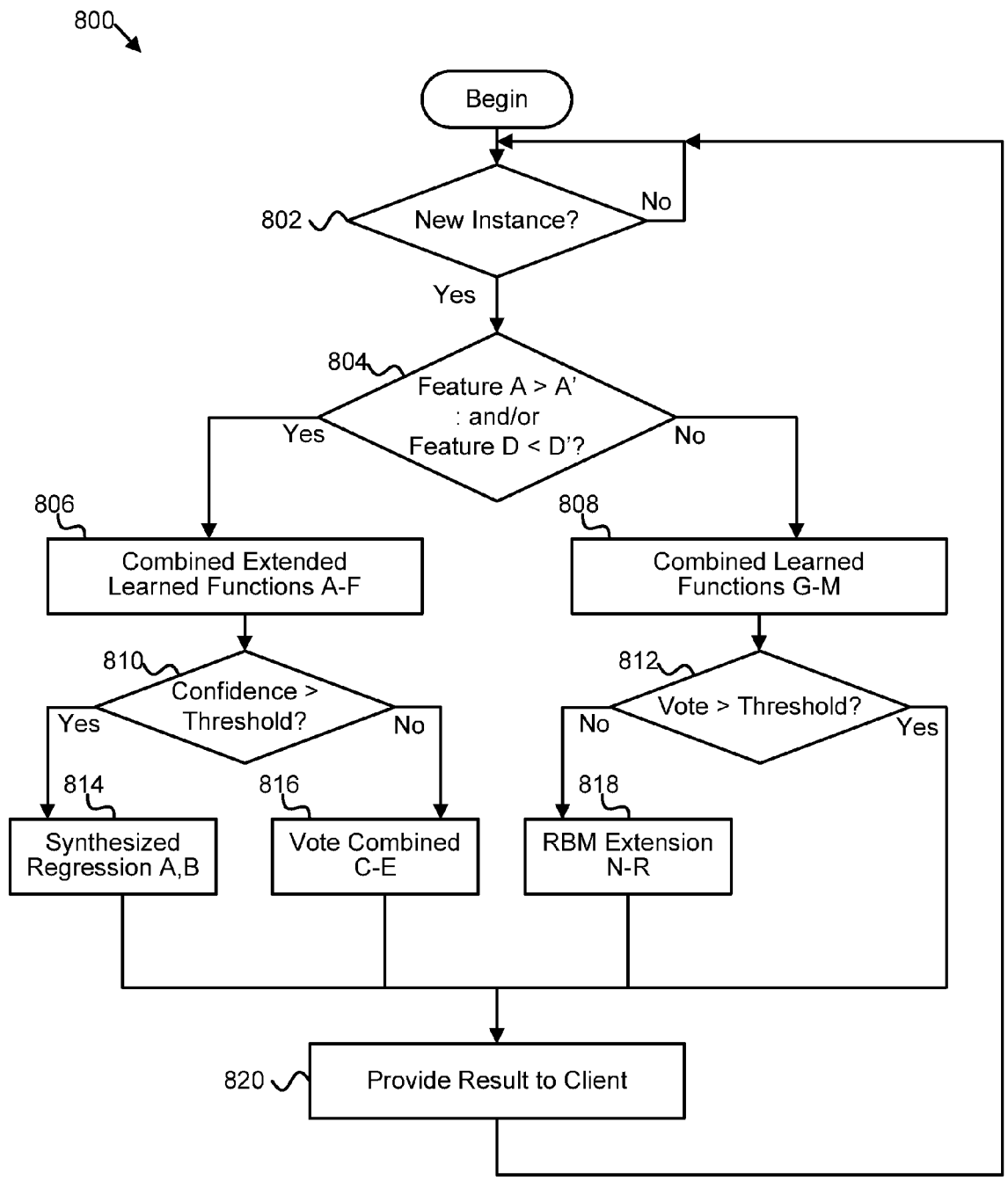
FIG. 8 is a schematic flow chart diagram illustrating one embodiment of a method for directing data through a machine learning ensemble.

FIG. 8 depicts one embodiment of a method 800 for directing data through a machine learning ensemble. The specific synthesized metadata rule set 322 of the depicted method 800 is presented by way of example only, and many other rules and rule sets may be used.

A new instance of workload data is presented 802 to the machine learning ensemble 222 through the interface module 402. The data is processed through the data receiver module 300 and configured for the particular analysis request as initiated by a client 404. In this embodiment the orchestration module 320 evaluates a certain set of features associates with the data instance against a set of thresholds contained within the synthesized metadata rule set 322.

A binary decision 804 passes the instance to, in one case, a certain combined and extended function 806 configured for features A-F or in the other case a different, parallel combined function 808 configured to predict against a feature set G-M. In the first case 806, if the output confidence passes 810 a certain threshold as given by the metadata rule set the instance is passed to a synthesized, extended regression function 814 for final evaluation, else the instance is passed to a combined collection 816 whose output is a weighted voted based processing a certain set of features. In the second case 808 a different combined function 812 with a simple vote output results in the instance being evaluated by a set of base learned functions extended by a Boltzmann type extension 818 or, if a prescribed threshold is meet the output of the synthesized function is the simple vote. The interface module 402 provides 820 the result of the orchestration module directing workload data through the machine learning ensemble 222 to a requesting client 404 and the method 800 continues.

Figure 9:
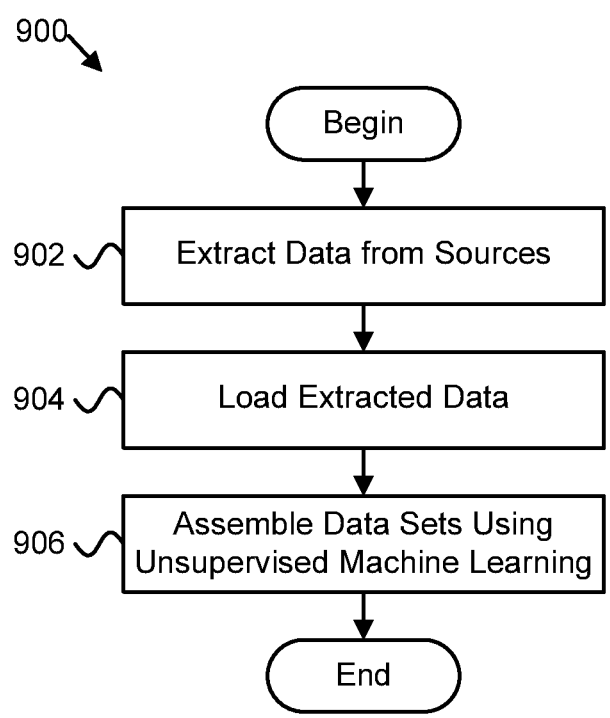
FIG. 9 is a schematic flow chart diagram illustrating one embodiment of a method for data intelligence using machine learning.

FIG. 9 depicts one embodiment of a method 900 for performing data analytics using machine learning. The method 900 begins, and the extract module 202 extracts data from one or more data sources (e.g., structured data sources). The load module 204 loads the extracted 902 data into an unstructured data set. The unsupervised learning module 906 assembles 906 the unstructured data set into one or more organized data sets using a plurality of unsupervised learning techniques and the method 900 ends.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for performing data analytics using machine learning, the apparatus comprising:
   an extract module configured to extract data from one or more structured data sources;
   a load module configured to load the data into an unstructured data set;
   an unsupervised learning module configured to assemble the unstructured data set into an organized data set using a plurality of unsupervised learning techniques; and
   a supervised learning module configured to generate one or more supervised learning machine learning programs based on the organized data set;
   wherein the extract module, the load module, the unsupervised learning module, and the supervised learning module comprise one or more of logic hardware and a non-transitory computer readable medium storing computer executable code.

2. The apparatus of claim 1, wherein the one or more supervised learning machine learning programs comprise one or more machine learning ensembles each comprising learned functions from multiple machine learning classes.

3. The apparatus of claim 2, wherein the unsupervised learning module is configured to assemble the unstructured data set into multiple versions of the organized data set, each version of the organized data set using a unique combination of one or more of the plurality of unsupervised learning techniques.

4. The apparatus of claim 3, wherein the supervised learning module is configured to generate one or more machine learning ensembles based on each of the multiple versions of the organized data set, and to select one version of the organized data set based on results from the one or more machine learning ensembles.

5. The apparatus of claim 2, further comprising an update module configured to update the one or more data sources with predicted results generated by the one or more machine learning ensembles.

6. The apparatus of claim 2, wherein the unsupervised learning module is configured to create training data from the organized data set, and wherein the supervised learning module is configured to use the training data to generate the one or more machine learning ensembles.

7. The apparatus of claim 1, wherein the plurality of unsupervised learning techniques includes clustering data from the unstructured data set using one or more clustering algorithms.

8. The apparatus of claim 1, wherein the plurality of unsupervised learning techniques includes mining metadata from the data in the unstructured data set.

9. The apparatus of claim 1, wherein the plurality of unsupervised learning techniques includes identifying relationships in data of the unstructured data set based on one or more queries submitted for the one or more structured data sources.

10. The apparatus of claim 1, wherein the plurality of unsupervised learning techniques includes identifying relationships in data of the unstructured data set by identifying semantic distances between data in the unstructured data set.

11. The apparatus of claim 1, wherein the plurality of unsupervised learning techniques includes using statistical data to determine a relationship between data in the unstructured data set.

12. The apparatus of claim 1, wherein the plurality of unsupervised learning techniques includes identifying relationships in data of the unstructured data set based on an access frequency of data of the unstructured data set.

13. The apparatus of claim 1, wherein the plurality of unsupervised learning techniques includes querying external data sources to determine a relationship between data in the unstructured data set.

14. The apparatus of claim 1, wherein the plurality of unsupervised learning techniques includes correlating data elements based on text search results.

15. The apparatus of claim 1, wherein the extract module is configured to extract executable code from the one or more structured data sources and the unsupervised learning module is configured to determine relationships between data elements based on the executable code.

16. The apparatus of claim 1, wherein the extract module is configured to extract data from a running data source and the load module is configured to load data extracted from the running data source into the unstructured data set.

17. A method for performing data analytics using machine learning, the method comprising:
   extracting data, using logic hardware, from one or more structured data sources;
   loading the data, using logic hardware, into an unstructured data set having an unstructured format;
   assembling the unstructured data set, using logic hardware, into an organized data set having a structured format using unsupervised machine learning; and
   generating one or more supervised machine learning learned functions, using logic hardware, based on the organized data set.

18. The method of claim 17, wherein assembling the unstructured data set includes assembling the unstructured data set into a structured data set using a plurality of unsupervised learning techniques.

19. The method of claim 18, wherein assembling the unstructured data set includes assembling the unstructured data set into multiple versions of an organized data set, each of the multiple versions of the organized data set being assembled using a unique combination of the plurality of unsupervised learning techniques.

20. The method of claim 19, wherein generating one or more supervised machine learning learned functions includes generating one or more machine learning ensembles based on each of the multiple versions of the organized data set; and the method further comprises determining which machine learning ensemble exhibits the highest predictive performance.

21. The method of claim 20, wherein assembling the unstructured data set into multiple versions of an organized data set includes assembling a sample set of the unstructured data set into multiple versions of an organized data set; and further comprising:
   assembling the unstructured data set into a complete organized data set using the unique combination of the plurality of unsupervised learning techniques used to assemble the version of the organized data set determined to have the best predictive quality; and
   generating one or more machine learning ensembles based on the complete organized data set.

22. An apparatus for performing data analytics using machine learning, the apparatus comprising:
   an unsupervised learning module configured to assemble an unstructured data set into multiple versions of an organized data set using unsupervised machine learning, the unstructured data set extracted from one or more structured data sources; and a supervised learning module configured to generate one or more supervised machine learning ensembles based on each version of the multiple versions of the organized data set, and to determine which machine learning ensemble exhibits a highest predictive performance;

wherein the unsupervised learning module and the supervised learning module comprise one or more of logic hardware and a non-transitory computer readable medium storing computer executable code.

23. The apparatus of claim 22, wherein the unsupervised learning module is configured to assemble each version of the organized data set using a unique combination of unsupervised learning techniques.

24. The apparatus of claim 22, wherein the plurality of unsupervised learning techniques includes clustering data from the unstructured data set using one or more clustering algorithms and one or more of:

mining metadata from the data in the unstructured data set;

identifying relationships in data of the unstructured data set based on one or more of analyzing process reports and analyzing process SQL queries;

identifying relationships in data of the unstructured data set by identifying semantic distances between data in the unstructured data set;

using statistical data to determine a relationship between data in the unstructured data set;

identifying relationships in data of the unstructured data set based on analyzing the access frequency of data of the unstructured data set;

querying external data sources to determine a relationship between data in the unstructured data set; and correlating data elements based on text search results.

25. The apparatus of claim 22, further comprising:

an extract module configured to extract data from the one or more structured data sources; and a load module configured to load the data into the unstructured data set having an unstructured format.

* * * * *